(12) United States Patent
Genmoto et al.

(10) Patent No.: US 10,840,784 B2
(45) Date of Patent: Nov. 17, 2020

(54) COIL FORMING DEVICE AND COIL OF A ROTATING ELECTRIC DEVICE

(71) Applicant: Hitachi Automotive Systems, Ltd., Hitachinaka (JP)

(72) Inventors: Takashi Genmoto, Hitachinaka (JP); Teruaki Higuchi, Hitachinaka (JP); Kenichi Nakayama, Hitachinaka (JP); Hiroyuki Takahoshi, Hitachinaka (JP); Tomohiro Fukuda, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 526 days.

(21) Appl. No.: 15/538,873

(22) PCT Filed: Dec. 4, 2015

(86) PCT No.: PCT/JP2015/084090
§ 371 (c)(1),
(2) Date: Jun. 22, 2017

(87) PCT Pub. No.: WO2016/104105
PCT Pub. Date: Jun. 30, 2016

(65) Prior Publication Data
US 2017/0353091 A1    Dec. 7, 2017

(30) Foreign Application Priority Data

Dec. 26, 2014 (JP) .................................. 2014-263722

(51) Int. Cl.
*H02K 15/04* (2006.01)
*B21F 3/04* (2006.01)
*H02K 3/12* (2006.01)

(52) U.S. Cl.
CPC ............ *H02K 15/0435* (2013.01); *B21F 3/04* (2013.01); *H02K 15/0421* (2013.01); *H02K 3/12* (2013.01)

(58) Field of Classification Search
CPC ............... H02K 15/04; H02K 15/0421; H02K 15/0435; H02K 15/0478; B21F 1/04;
(Continued)

(56) References Cited

U.S. PATENT DOCUMENTS 2,466,381 A * 4/1949 Clouse .................. B21D 7/024
72/158
7,032,422 B2 * 4/2006 Hatano .................... B21D 9/07
72/150
(Continued)

FOREIGN PATENT DOCUMENTS

CN    102341197 A    2/2012
JP    S55-122924 U    9/1980
(Continued)

OTHER PUBLICATIONS

Office Action received in corresponding Japanese Application No. 2018-094239, dated Mar. 19, 2019 and Machine translation thereof.
(Continued)

*Primary Examiner* — Adam J Eiseman
*Assistant Examiner* — Bobby Yeonjin Kim
(74) *Attorney, Agent, or Firm* — Foley & Lardner LLP

(57) ABSTRACT

An object of the invention is to increase productivity of a coil.
A coil forming device according to the present invention includes: a first bending unit 200A that performs a compression bending process with respect to a linear conductor; and a second bending unit 200B that performs a draw bending process with respect to the linear conductor, wherein the first bending unit 200A and the second bending
(Continued)

unit 200B are integrated in one device, and wherein the first bending unit 200A and the second bending unit 200B are switched to access one linear conductor so as to perform the compression bending process and the draw bending process onto the one linear conductor.

5 Claims, 30 Drawing Sheets

(58) Field of Classification Search
CPC ...... B21F 3/00; B21F 3/02; B21F 3/04; Y10T 29/49071
USPC .......................................... 72/127, 306, 307
See application file for complete search history.

(56) References Cited

U.S. PATENT DOCUMENTS

| | | | |
|---|---|---|---|
| 7,104,100 B2 | 9/2006 | Saegusa | |
| 7,357,012 B2* | 4/2008 | Schumacher | H02K 15/0421 |
| | | | 140/92.1 |
| 9,901,968 B2* | 2/2018 | Nozu | B21D 7/025 |
| 2003/0019270 A1* | 1/2003 | Kobayashi | B21D 11/07 |
| | | | 72/154 |
| 2003/0205074 A1* | 11/2003 | O'Donnell | B21D 7/02 |
| | | | 72/155 |
| 2005/0126245 A1* | 6/2005 | Saegusa | B21D 7/024 |
| | | | 72/149 |
| 2008/0295559 A1* | 12/2008 | Etienne | B21D 7/02 |
| | | | 72/150 |
| 2010/0170317 A1* | 7/2010 | Saito | B21D 7/02 |
| | | | 72/298 |
| 2011/0030445 A1 | 2/2011 | Saito et al. | |
| 2014/0319942 A1 | 10/2014 | Nakayama et al. | |
| 2015/0302988 A1* | 10/2015 | Shirai | B21F 3/04 |
| | | | 72/142 |
| 2015/0303754 A1 | 10/2015 | Fukuda et al. | |

FOREIGN PATENT DOCUMENTS

| | | |
|---|---|---|
| JP | S60-119880 U | 8/1985 |
| JP | 2003-143818 A | 5/2003 |
| JP | 2004-072838 A | 3/2004 |
| JP | 2007-074881 A | 3/2007 |
| JP | 2010-207823 A | 9/2010 |
| JP | 2013-070518 A | 4/2013 |
| JP | 2013-198328 A | 9/2013 |
| JP | 2014-087224 A | 5/2014 |

OTHER PUBLICATIONS

Office Action dated Aug. 29, 2018 in Chinese Patent Application No. 201580066080.3.
International Search Report dated Mar. 29, 2016 as issued in corresponding International Application No. PCT/JP2015/084090.
Anonymous, "Mechanical Engineering: Tube Bending Methods—Rotary Draw Bending, Compression Bending, Ram Bending, 3 Roll Bending", Jun. 1, 2014, XP055493335, Retrieved from the Internet: URL:http://mechanicalgalaxy.blogspot.com/2014/06/tube-bending-methods-rotary-draw.html.
Extended European Search Report dated Aug. 9, 2018 in Application No. 15872674.5.
Office Action received in corresponding Japanese Patent Application No. 2018-094239 dated Oct. 23, 2019 with English translation.

* cited by examiner

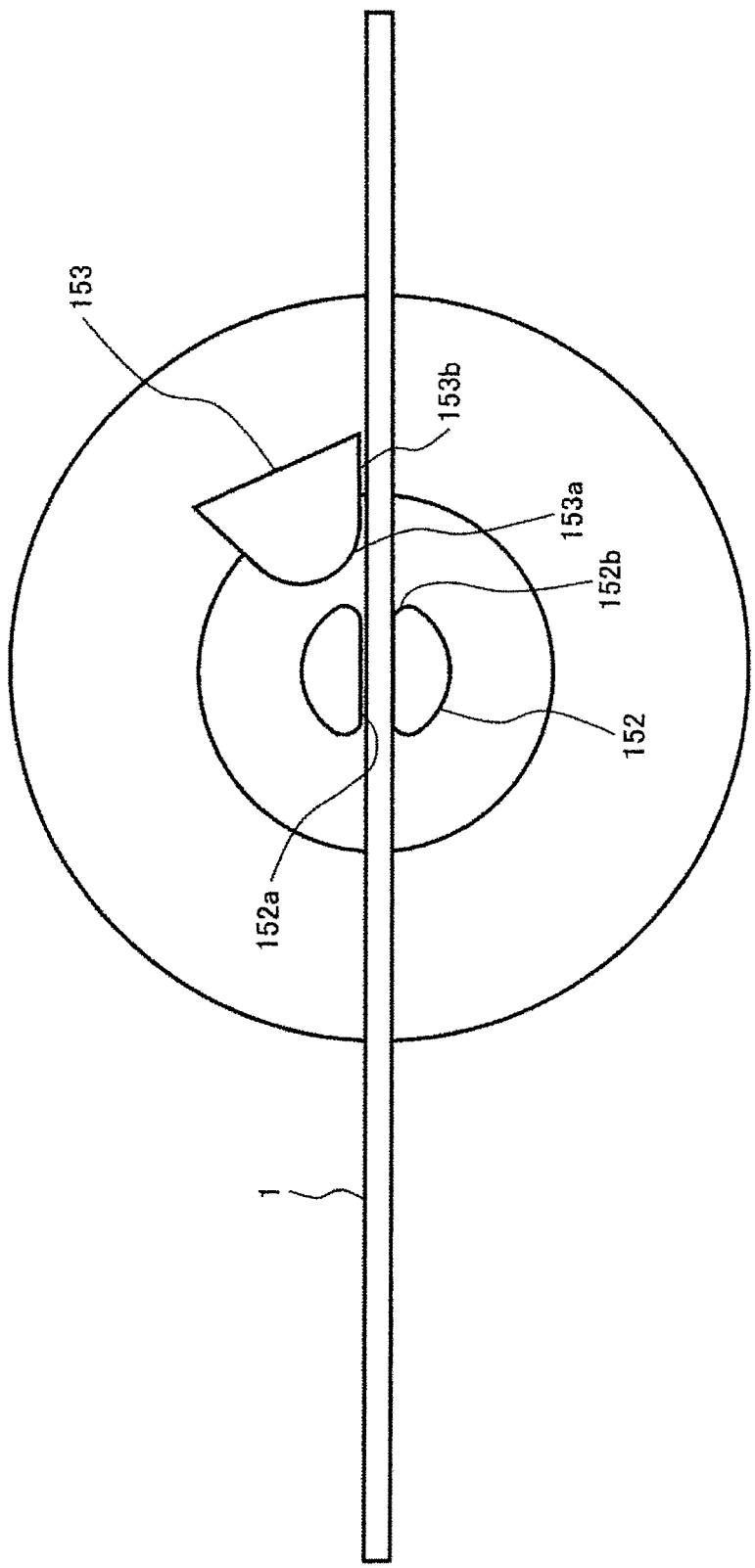

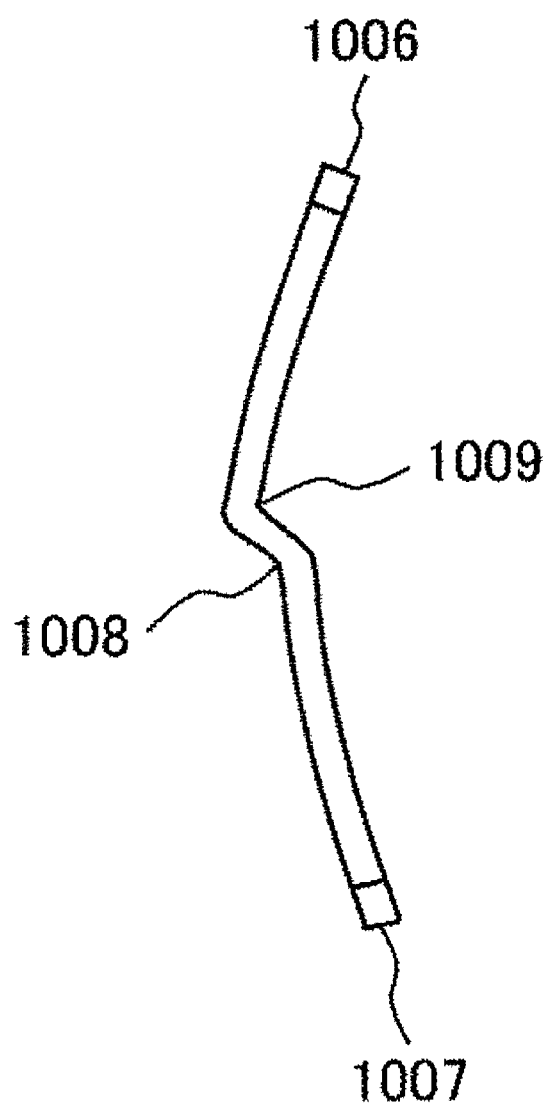

COIL FORMING DEVICE AND COIL OF A ROTATING ELECTRIC DEVICE

TECHNICAL FIELD

The present invention relates to a rotating electric device such as an electric motor and a generator and a manufacturing method thereof, and particularly to a coil (winding) used in the rotating electric device and a manufacturing method thereof.

BACKGROUND ART

As a background art of the related art, there is JP 2003-143818 A (PTL 1). In this publication, a method of manufacturing a split conductor which is used to form a segment coil is disclosed. The segment coil is formed by bonding the split conductors which are formed by dividing the manufactured coil (see paragraph 0002). The manufacturing method is aimed at reducing the coil end in size and also to prevent damage on an insulating film. Then, in this manufacturing method, there are provided the steps of correcting a linear conductor material stored in a wound state into a straight line shape while delivering the material, bending the straightened conductor material using a bender machine to be formed in a two-dimensional shape, interposing and molding the conductor material formed in the two-dimensional shape using a mold of a press molding machine, and cutting the conductor material by a predetermined length to mold a split conductor of a three-dimensional shape (see Abstract).

CITATION LIST

Patent Literature

PTL 1: JP 2003-143818 A

SUMMARY OF INVENTION

Technical Problem

In the manufacturing method of PTL 1, the coil end can be made small in size, and also the damage of the insulating film can be prevented. However, there is a need to increase productivity of the coil by improving reliability of the coil still more, or by increasing a manufacturing speed further more.

An object of the invention is to increase the productivity of the coil.

Solution to Problem

In order to achieve the above object, a coil forming device according to the present invention includes: a first bending unit that performs a compression bending process with respect to a linear conductor; and a second bending unit that performs a draw bending process with respect to the linear conductor, wherein the first bending unit and the second bending unit are integrated in one device, and wherein the first bending unit and the second bending unit are switched to access one linear conductor so as to perform the compression bending process and the draw bending process onto the one linear conductor.

In addition, a coil of a rotating electric device according to the present invention is configured by connecting a plurality of split coils, the split coil being formed by bending a conductor coated with an insulating film, wherein the split coil includes a first bent portion which is subjected to a compression bending process, and a second bent portion which is subjected to a draw bending process, and wherein the second bent portion is subjected to a bending process in order to form an impression by a molding mechanism only in an inner periphery of the second bent portion among the first bent portion and the second bent portion.

Advantageous Effects of Invention

According to the invention, is possible to increase productivity of a coil.

Objects, configurations, and features other than those described above will become clear through the explanation about the following embodiments.

BRIEF DESCRIPTION OF DRAWINGS

FIG. 9C is a plan view illustrating the bending unit (bending device) 150 on a magnified scale.

FIG. 18B is a plan view of the split coil 1000 of FIG. 19A when viewed from the right side.

DESCRIPTION OF EMBODIMENTS

Hereinafter, embodiments according to the invention will be described. In the following embodiments according to the invention, the description will be given about a split conductor of a segment coil and a method of manufacturing the split conductor. In the embodiments, conductors (wires) for forming the segment coil and the split conductor will be described using a rectangular wire of which the cross section is rectangular, but a circular wire of which the cross section is circular can be applied. There are a conductor of which the cross section is square or a conductor (flat wire) which has alongside (long axis) and a short side (short axis), but the embodiments may be applied to any type of conductor. However, a directional nature of the cross section of the conductor during a bending process and a pressing process is taken into account, and the rectangular wire is used in order to achieve a larger effect compared to the circular wire. The following embodiments will be described about a flat wire of which the cross section has a long side and a short side. Further, in the following description, the long side may be referred to as a flatwise, and the short side may be referred to as an edgewise. In addition, a conductor formed in the split conductor will be referred to as a linear conductor.

In the following description, a conveyance direction of a linear conductor 1 described below is set to a length direction of a coil forming device. In addition, a direction perpendicular to the conveyance direction of the linear conductor 1 in a horizontal direction is set to a width direction of the coil forming device. In addition, a height direction of the coil forming device is a vertical direction. The coil forming device has a dimension in the length direction larger than that in the width direction, and the length direction is matched with a longitudinal direction of the coil forming device.

Figure 17:
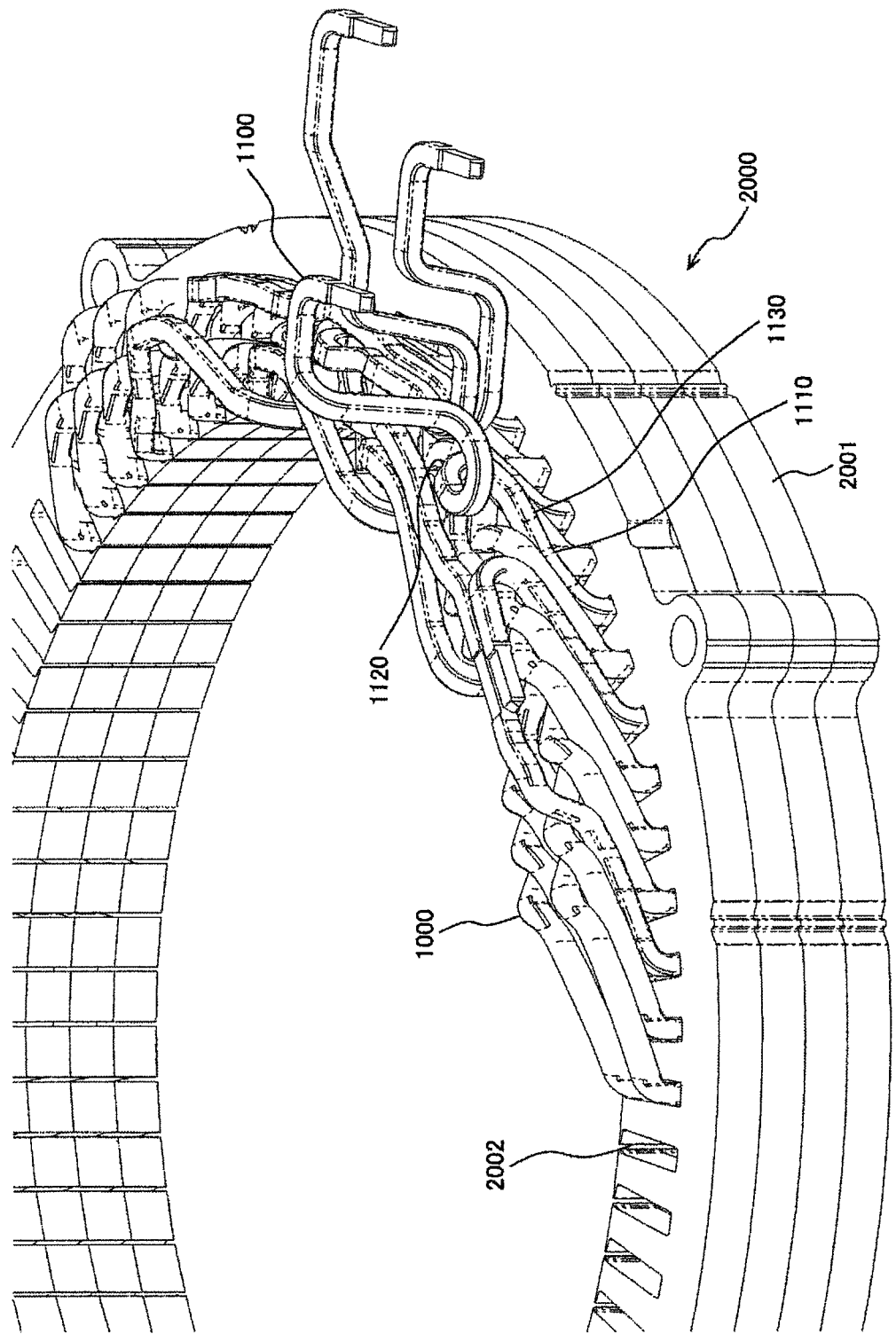
FIG. 17 is a perspective view of a motor stator 2000 which is configured using split coils 1000 and 1100.

FIG. 17 illustrates a perspective view of a motor stator 2000 which is configured using split coils 1000 and 1100. A slot 2002 is formed in an iron core 2001 of the motor stator 2000, and the split coils 1000 and 1100 are inserted in the slot to form a motor coil.

The forming of the split coil 1000 will be described in a first embodiment, and the forming of the split coil 1100 will be described in a second embodiment.

First Embodiment

Figure 1:
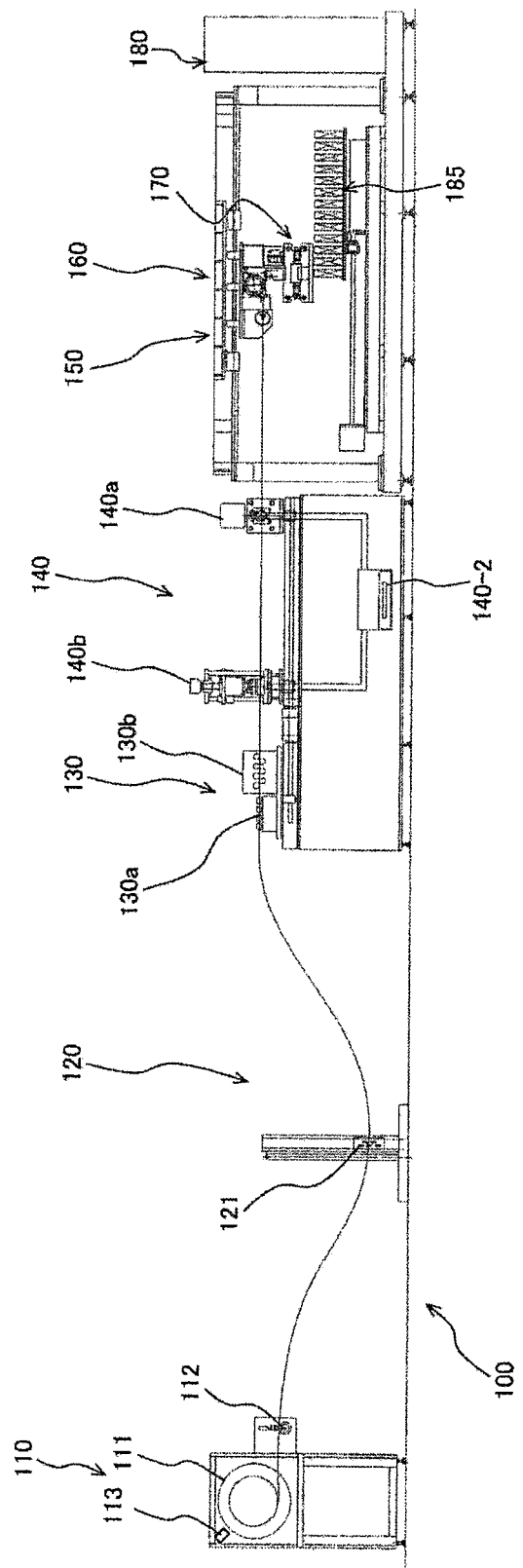
FIG. 1 is a plan view illustrating the entire configuration of a U-shaped coil forming device according to an embodiment of the invention.

Using FIG. 1, the entire configuration of a U-shaped coil forming device according to the invention will be described. FIG. 1 is a plan view illustrating the entire configuration of the U-shaped coil forming device according to this embodiment.

A U-shaped coil forming device 100 includes an uncoiler 110, a buffer 120, a correction unit (correction device) 130, a peeling unit (peeling device) 140, a bending unit (bender) 150, a conveying unit (conveying device) 160, and a pressing unit (press device) 170 from the left side of FIG. 1, all of which are disposed on a straight line in this order to perform processes on the linear conductor in this order. Further, a control device 180 of the U-shaped coil forming device 100 is disposed on the right side of the pressing unit 170. The U-shaped coil subjected to the bending and pressing processes is stored in a storage unit (magazine) 185 which is disposed below the bending unit (bending device) 150, the conveying unit (conveying device) 160, and the pressing unit (press device) 170.

The uncoiler 110 includes, as main components, a bobbin 111 around which the linear conductor is wound, a pinch roller device 112 which is provided on the downstream side in the conveyance direction of the linear conductor with respect to the bobbin 111, and a laser displacement meter 113 which measures an outer diameter of the bobbin 111.

Figure 2A:
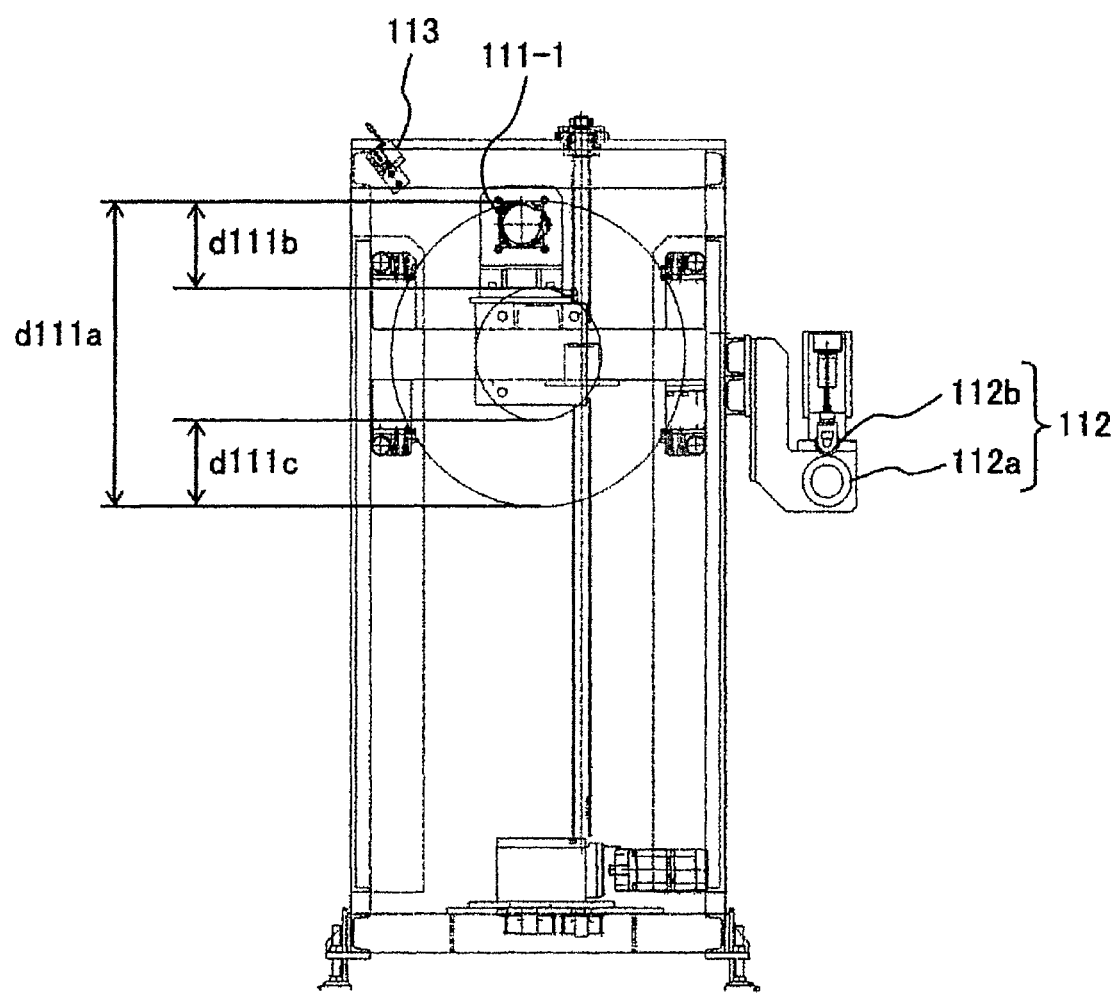
FIG. 2A is a front view of an uncoiler 110.
Figure 2B:
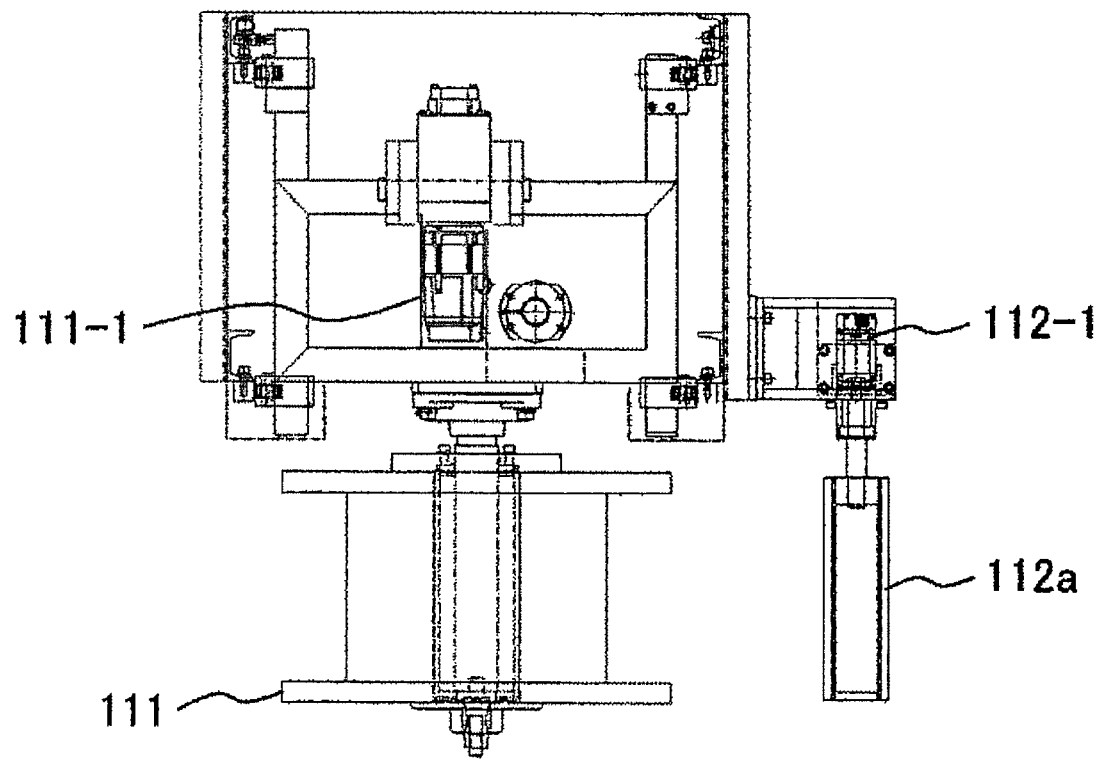
FIG. 2B is a top view of the uncoiler 110.

The uncoiler 110 will be described in detail using FIGS. 2A and 2B. FIG. 2A is a front view of the uncoiler 110. FIG. 2B is a top view of the uncoiler 110. Further, some components are omitted in FIGS. 2A and 2B in order to help with explanation, and thus there may be a component which is drawn in FIG. 2A but not in FIG. 2B, or drawn in FIG. 2B but not in FIG. 2A.

A servo motor 111-1 is provided in the bobbin 111, and the bobbin 111 is rotatably driven by the servo motor 111-1. The servo motor 111-1 is controlled in its rotation such that the linear conductor is delivered from the bobbin 111 at a constant speed according to the outer diameter of the bobbin measured by the laser displacement meter 113. Therefore, a load applied on the peeling device 140 is relieved when the linear conductor is conveyed by the peeling device 140 described below, and an influence on a peeling operation of the peeling device 140 is suppressed or prevented.

The pinch roller device 112 includes a first roller 112a and a second roller 112b. The first roller 112a is rotatably driven by a servo motor 112-1. The servo motor 112-1 is controlled in rotation by a torque control in order to keep the tension of the linear conductor 1. The second roller 112b pushes the first roller 112a on a constant load. Therefore, the linear conductor delivered from the bobbin 111 is interposed by the first roller 112a and the second roller 112b to flow toward the downstream side. With this configuration, it is prevented that the linear conductor delivered from the bobbin 111 is pulled down from the bobbin 111, and entangled in the vicinity of the bobbin 111. In other words, the linear conductor delivered from the bobbin 111 is quickly fed to a position where it is separated from the bobbin 111 (on a side near the buffer 120).

Therefore, the pinch roller device 112 is provided in order not to convey the linear conductor but to prevent that the linear conductor in the bobbin 111 is not entangled. Therefore, the installation height of the pinch roller device 112 is desirably set within a height range corresponding to the winding range of the linear conductor in the bobbin 111. For this reason, the installation height of the pinch roller device 112 is desirably set within a range d111a between the highest position and the lowest position in the outer diameter (outer periphery) of the bobbin 111. More preferably, in a case where the linear conductor is pulled out of the upper side from the rotation center of the bobbin ill, the installation height of the pinch roller device 112 is desirably set with in a range d111b between the highest position in the linear-conductor winding surface of the bobbin 111 and the highest position in the outer diameter (outer periphery) of the bobbin 111. Alternatively, in a case where the linear conductor is pulled out of the lower side from the rotation center of the bobbin 111, the installation height of the pinch roller device 112 is desirably set with in a range d111c between the lowest position in the linear-conductor winding surface of the bobbin 111 and the lowest position in the outer diameter (outer periphery) of the bobbin 111. Further, a wire of the linear conductor is thin, the linear conductor is pulled out of the upper side from the rotation center of the bobbin 111. When the wire of the linear conductor is thick, the linear conductor is pulled out of the lower side from the rotation center of the bobbin 111.

Next, the buffer 120 will be described. The buffer 120 is disposed between the uncoiler 110 and the correction unit (correction device) 130. In other words, in the conveyance direction (feed direction) of the linear conductor, the buffer is located on the downstream side of the uncoiler 110 or on the upstream side of the correction unit 130. In the buffer 120, the linear conductor delivered from the bobbin 111 is kept in a loosened state. A loosened amount of the linear conductor in the buffer 120 is set within a predetermined range. Therefore, an optical sensor 121 is provided in the buffer 120.

The optical sensor 121 includes a light emitting unit and a light receiving unit. When the amount of light detected by the light receiving unit is less than a predetermined value (threshold), the optical sensor is turned on. When the detected amount of light is larger than the predetermined value (threshold), the optical sensor is turned off. When the light from the light emitting unit is blocked by the linear conductor and the amount of light detected by the light receiving unit is less than the predetermined value, the optical sensor 121 is turned on, and the linear conductor can be detected. The optical sensor 121 includes five pairs of the light emitting units and the light receiving units, and five pairs of the light emitting units and the light receiving units are disposed in the vertical direction (longitudinal direction).

In a case where the pair disposed at the center among the five pairs outputs an ON signal, the loosened amount of the linear conductor is appropriate. In a case where the pair disposed on one lower side of the pair disposed at the center outputs the ON signal, the loosened amount of the linear conductor is too loosened. In this case, the outer diameter of the bobbin measured by the laser displacement meter 113 is corrected to be positively increased, and the delivering speed of the linear conductor from the bobbin 111 is set to be delayed. In a case where the pair disposed on the lowest side is turned on, the control device 180 determines that it is an uncontrollable abnormal state and stops the U-shaped coil forming device 100. In a case where the pair disposed on the next upper side of the pair disposed at the center outputs the ON signal, it indicates that the linear conductor is too drawn. In this case, the outer diameter of the bobbin measured by the laser displacement meter 113 is corrected to be negatively decreased, and the delivering speed of the linear conductor from the bobbin 111 is set to be fast. In a case where the pair disposed on the highest side is turned on, the control device 180 determines that it is an uncontrollable abnormal state, and stops the U-shaped coil forming device 100.

Figure 3:
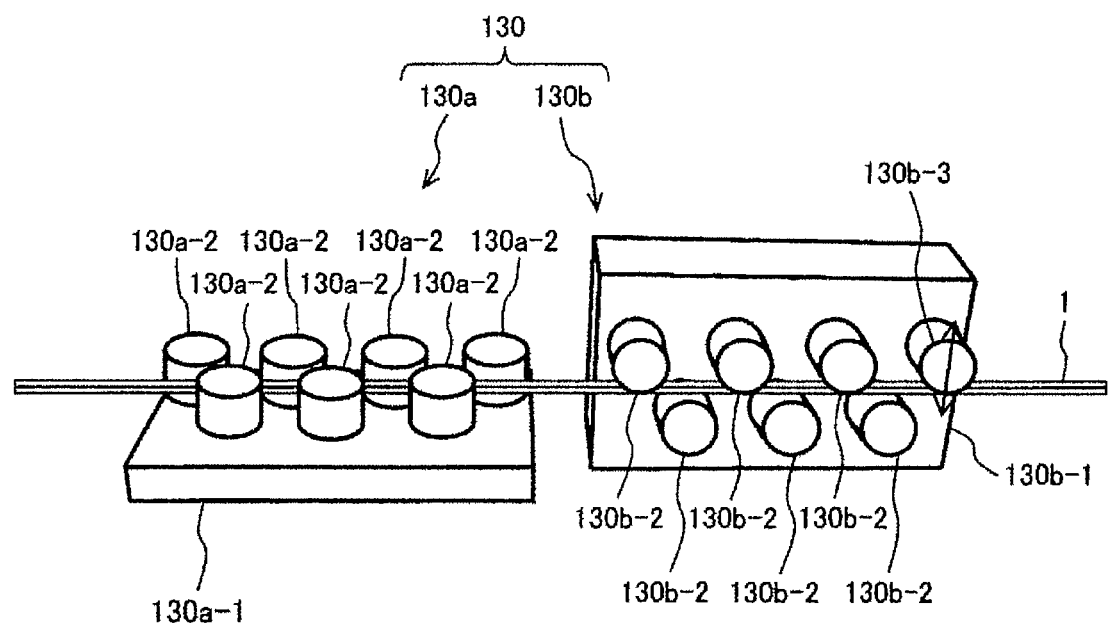
FIG. 3 is a perspective view illustrating a configuration of a correction unit 130.

Next, the description will be given about the correction unit (correction device) 130 using FIG. 3. FIG. 3 is a perspective view illustrating a configuration of the correction unit 130. The correction device provided in the correction unit 130 is configured by an edgewise correction device 130a and a flatwise correction device 130b.

The edgewise correction device 130a includes a base 130a-1 and seven fixed rollers 130a-2 provided on the base 130a-1. The respective rollers 130a-2 are rotatably provided at fixed positions with respect to the base 130a-1.

The flatwise correction device 130b includes a base 130b-1, six fixed rollers 130b-2 provided on the base 130b-1, and one movable roller 130b-3. Six fixed rollers 130b-2 are rotatably provided at fixed positions with respect to the base 130b-1. The movable roller, which is disposed on the upper side with respect to the linear conductor 1 and disposed on the most-downstream side in the feeding direction of the linear conductor 1, is driven up and down (vertical direction), and the bending in the flatwise of the linear conductor 1 is corrected.

The linear conductor 1 is wound while the flatwise faces the linear-conductor winding surface of the bobbin 111. Therefore, the movable roller 130b-3 is provided on a side near the flatwise correction device 130b in order to effectively correct the bending (curling) of the flatwise. As needed, a movable roller driven in a lateral direction (horizontal direction) intersecting with the feeding direction of the linear conductor 1 may be provided in the edgewise 130a correction device 130a.

Next, the description will be given about the peeling unit (peeling device) 140 using FIGS. 4 to 8. Further, the linear conductor 1 is a flat wire (square conductor) configured by a rectangular cross section which is perpendicular to the axis line in the longitudinal direction of the conductor and has a long side (flatwise) and a short side (edgewise). The surrounding of the linear conductor is insulated by an enamel film (insulating member). In addition, in this embodiment, the linear conductor 1 is conveyed in a state where the long side (flatwise) is in the horizontal direction or the short side (edgewise) is in the vertical direction.

Figure 4:
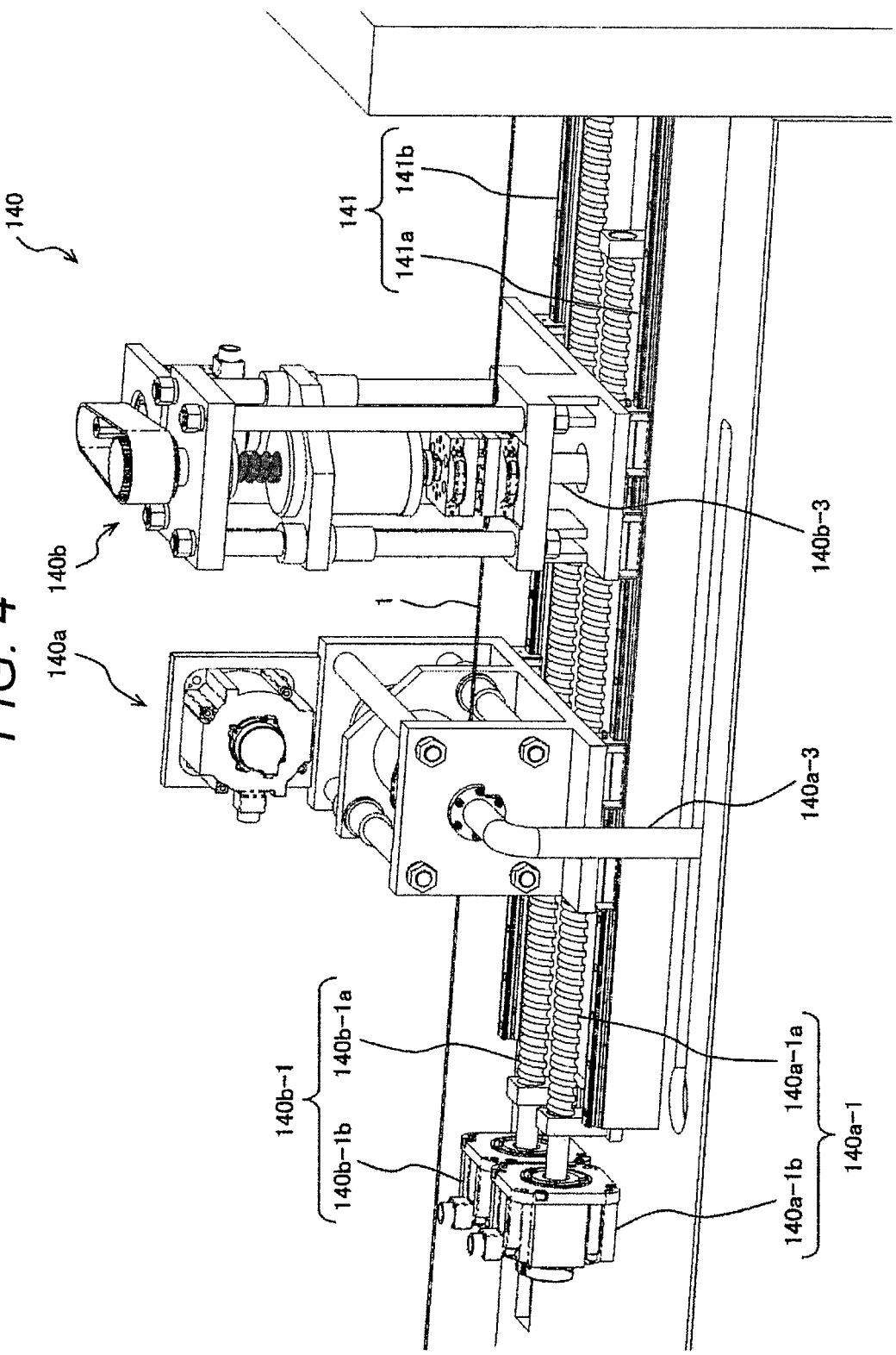
FIG. 4 is a perspective view illustrating the entire configuration of a peeling unit (peeling device) 140.

FIG. 4 is a perspective view illustrating the entire configuration of the peeling unit (peeling device) 140. The peeling device 140 includes a peeling device 140a which peels off the enamel film of the flatwise, and a peeling device 140b which peels off the enamel film of the edgewise. In FIG. 4, in the feeding direction of the linear conductor 1, the peeling device 140a is disposed on the upstream side with respect to the peeling device 140b. The layout of the peeling device 140a and the peeling device 140b may be set such that the peeling device 140b is disposed on the upstream side with respect to the peeling device 140a as illustrated in FIG. 1. The following description will be given on the basis of the configuration that the peeling device 140a is disposed on the upstream side with respect to the peeling device 140b as illustrated in FIG. 4.

A flatwise peeling device 140a is configured to be movable in the feeding direction of the linear conductor 1 by a feeding mechanism 140a-1 which includes a rod screw 140*a*-1*a* and a servo motor 140*a*-1*b* which rotatably drives the rod screw 140*a*-1*a*. A nut (not illustrated) is provided in the peeling device 140*a* to be screwed with the rod screw 140*a*-1*a*. The nut is a component of the feeding mechanism 140*a*-1, and moves in an axis direction of the rod screw 140*a*-1*a* while the rod screw 140*a*-1*a* is rotatably driven by the servo motor 140*a*-1*b*. While the rod screw 140*a*-1*a* and the nut are operated, the peeling device 140*a* moves in the feeding direction of the linear conductor 1. In addition, a pipe 140*a*-3 is provided in the peeling device 140*a* to carry scraps including the enamel film peeled out of the linear conductor 1 into a dust collecting box 140-2 (see FIG. 1).

An edgewise peeling device 140*b* is configured to be movable in the feeding direction of the linear conductor 1 by a feeding mechanism 140*b*-1 which includes a rod screw 140*b*-1*a* and the servo motor 140*b*-1*b* which rotatably drives the rod screw 140*b*-1*a*. A nut (not illustrated) is provided in the peeling device 140*b*, and screwed with the rod screw 140*b*-1*a*. The nut is a component of the feeding mechanism 140*b*-1, and moves in the axis direction of the rod screw 140*b*-1*a* while the rod screw 140*b*-1*a* is rotatably driven by the servo motor 140*b*-1*b*. While the rod screw 140*b*-1*a* and the nut are operated, the peeling device 140*b* moves in the feeding direction of the linear conductor 1. In addition, the pipe 140*b*-3 is provided in the peeling device 140*b* to carry scraps including the enamel film peeled out of the linear conductor 1 into the dust collecting box 140-2 (see FIG. 1). Further, a dust collecting mechanism is provided in the dust collecting box 140*b*-2.

In the peeling device 140, a guide rail 141 is provided to guide the movement of the peeling device 140*a* and the peeling device 140*b*. The guide rail 141 includes two guide rails 141*a* and 141*b* which are disposed separately in the width direction of the coil forming device 100. The guide rail 141 is a component of the feeding mechanism 140*a*-1 of the peeling device 140*a*, and is a component of the feeding mechanism 140*b*-1 of the peeling device 140*b*. In other words, the guide rail 141 is commonly used by the feeding mechanism 140*a*-1 of the peeling device 140*a* and the feeding mechanism 140*b*-1 of the peeling device 140*b*.

In this embodiment, the linear conductor 1 is conveyed using the peeling device 140*a* and the peeling device 140*b*. In other words, the peeling device 140*a* and the peeling device 140*b* form a conveying device (feeding mechanism) of the linear conductor 1. Therefore, the peeling device 140*a* and the peeling device 140*b* are controlled in phase which will be described in detail below.

Figure 5A:
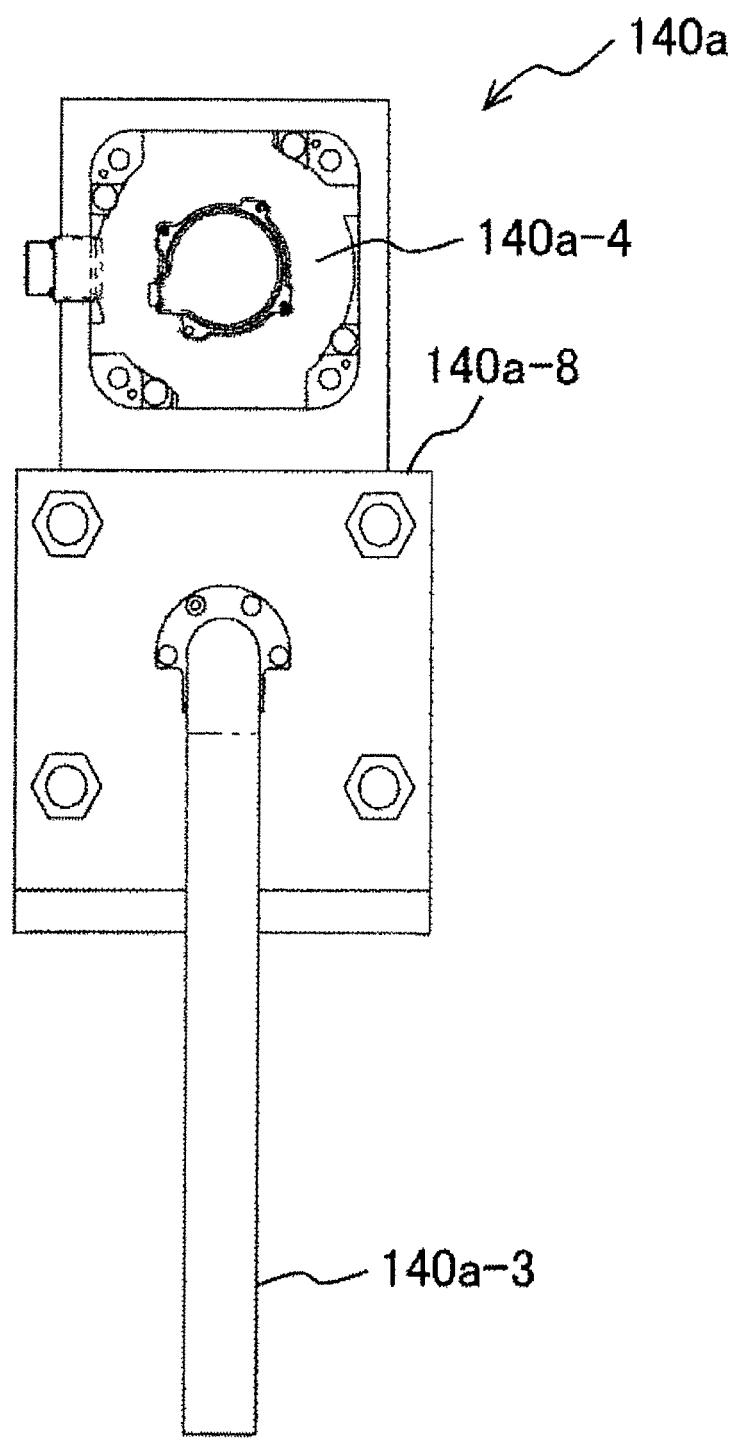
FIG. 5A is a front view of a flatwise peeling device 140a when viewed in a width direction of the peeling device 140.
Figure 5B:
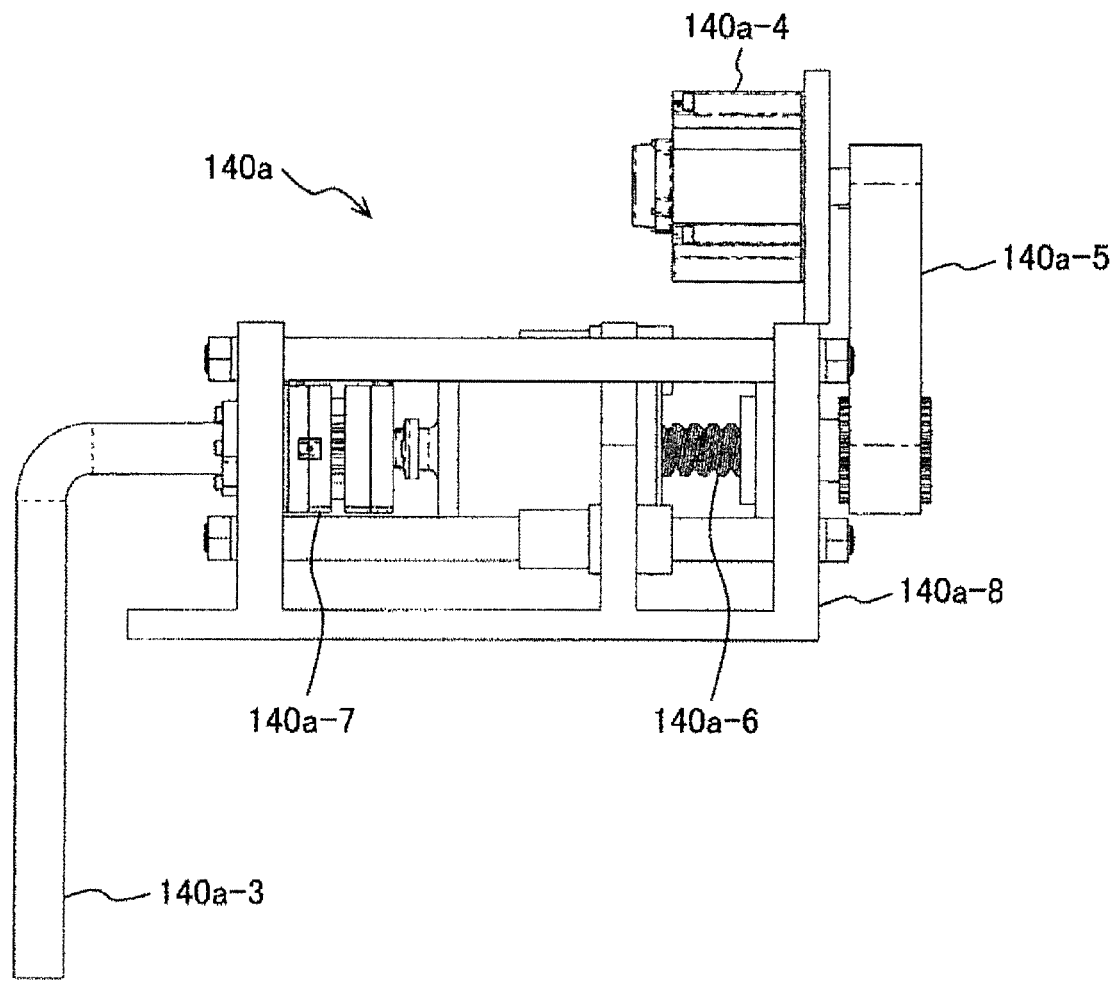
FIG. 5B is a side view of the flatwise peeling device 140a when viewed in a length direction (the right side of FIG. 5A) of the peeling device 140.
Figure 6A:
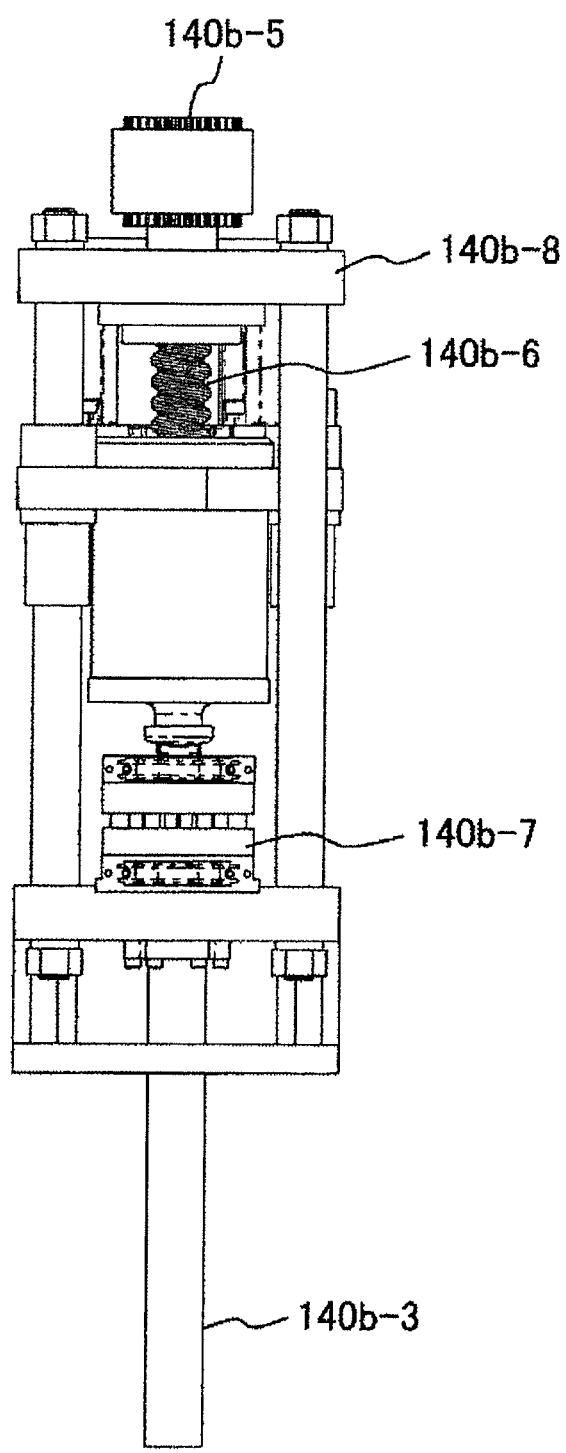
FIG. 6A is a front view of an edgewise peeling device 140b when viewed in the width direction of the peeling device 140.
Figure 6B:
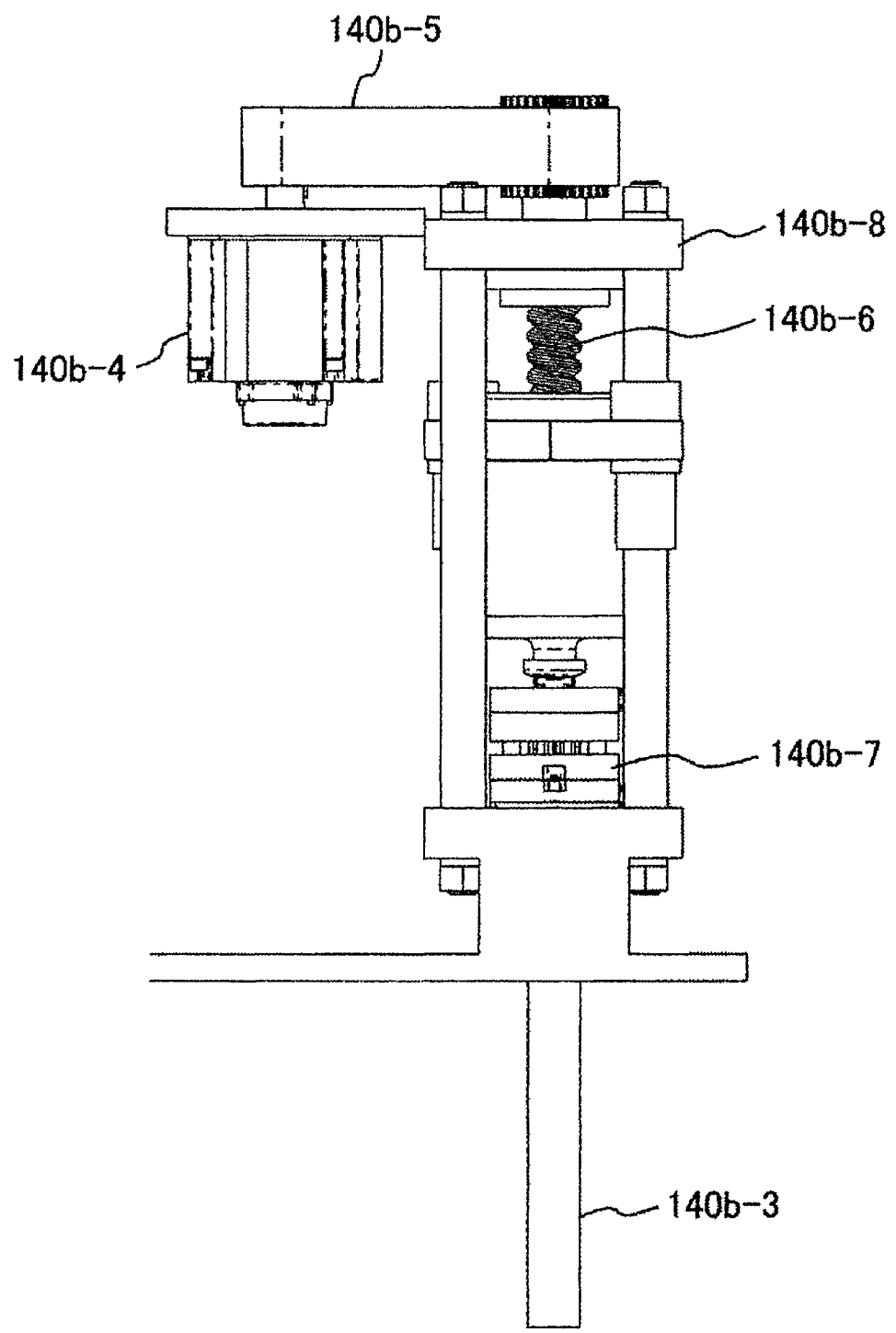
FIG. 6B is a side view of the edgewise peeling device 140b when viewed in the length direction (the left side of FIG. 6A) of the peeling device 140.

FIG. 5A is a front view of the flatwise peeling device 140*a* when viewed in the width direction of the peeling device 140, and FIG. 5B is a side view of the flatwise peeling device 140*a* when viewed in the length direction (the right side of FIG. 5A) of the peeling device 140. FIG. 6A is a front view of the edgewise peeling device 140*b* when viewed in the width direction of the peeling device 140, and FIG. 6B is a side view of the edgewise peeling device 140*b* when viewed in the length direction (the left side of FIG. 6A) of the peeling device 140.

The peeling device 140*a* includes a mold 140*a*-7 which peels off the enamel film of the flatwise. In addition, the peeling device 140*b* includes a mold 140*b*-7 which peels off the enamel film of the edgewise. The basic configurations of the peeling device 140*a* and the peeling device 140*b* are the same while the layout is different. In other words, the mold 140*a*-7 of the peeling device 140*a* is driven in the horizontal direction, and on the contrary the mold 140*b*-7 of the peeling device 140*b* is driven in the vertical direction. Therefore, the description will be collectively given about the peeling device 140*a* and the peeling device 140*b*.

Servo motors 140*a*-4 and 140*b*-4 and transmission mechanisms 140*a*-5 and 140*b*-5, which transmit the rotations of the servo motors 140*a*-4 and 140*b*-4 to rod screws 140*a*-6 and 140*b*-6, are provided in order to drive movable molds (described below) of the molds 140*a*-7 and 140*b*-7. The rod screw 140*a*-6 is rotatably driven by a rotational force which is transmitted from the servo motors 140*a*-4 and 140*b*-4 by the transmission mechanism 140*a*-5. The rod screws 140*a*-6 and 140*b*-6 are screwed with nuts (not illustrated) which are provided in main frames 140*a*-8 and 140*b*-8. Therefore, the rod screws 140*a*-6 and 140*b*-6 are rotated to drive the movable molds of the molds 140*a*-7 and 140*b*-7 provided at the ends thereof to move the movable molds toward fixed molds.

Figure 7:
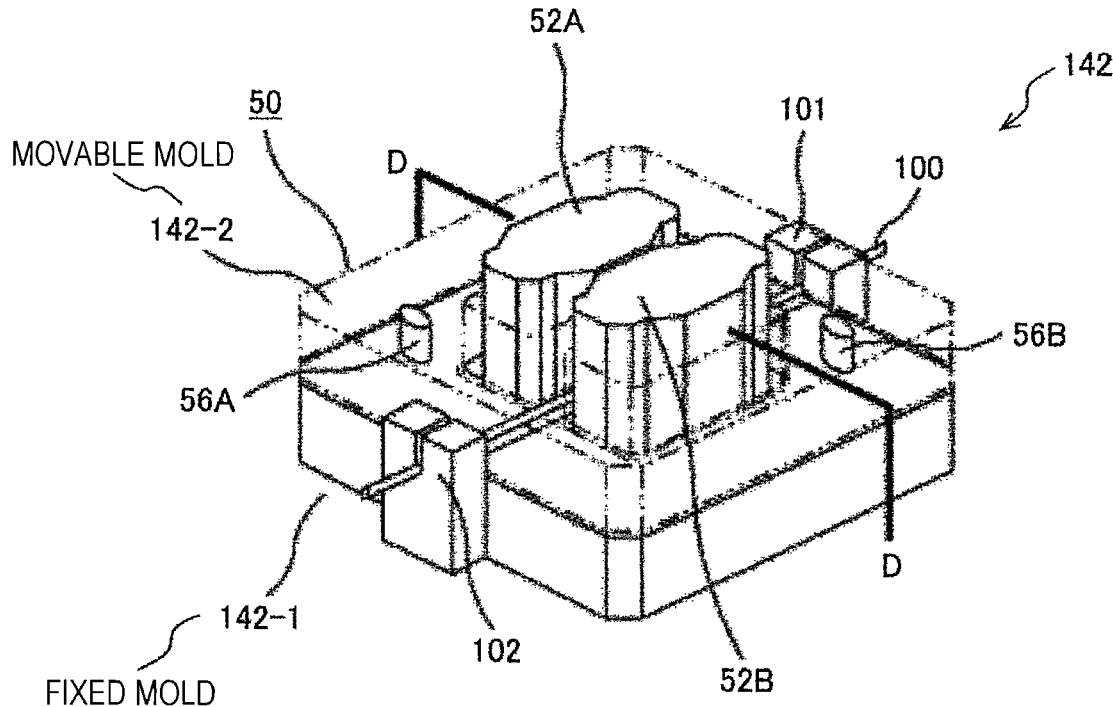
FIG. 7 is a perspective view illustrating a mold 142 which peels off an enamel film.
Figure 8:
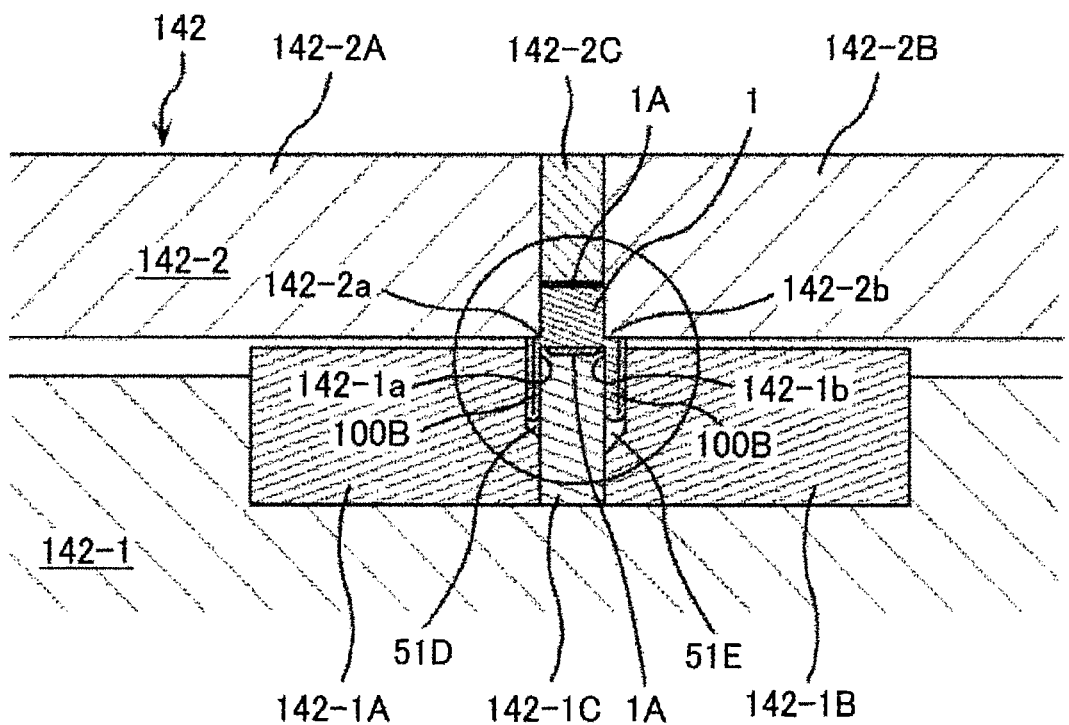
FIG. 8 is a cross-sectional view for describing an isolating (removing) work of the enamel film.

FIG. 7 is a perspective view illustrating the mold 142 which peels off the enamel film. FIG. 8 is a cross-sectional view for describing an isolating (removing) work of the enamel film. The mold 140*a*-7 of the peeling device 140*a* and the mold 140*b*-7 of the peeling device 140*b* have the same structure, and operate in the same way. Therefore, the mold 140*a*-7 and the mold 140*b*-7 will be collectively descried as the mold 142 in FIGS. 7 and 8. Further, the fixed mold and the movable mold are disposed in the mold 140*a*-7 of the flatwise peeling device 140*a* to be separated in the width direction of the coil forming device 100, and the fixed mold and the movable mold are disposed in the mold 140*b*-7 of the edgewise peeling device 140*b* to be separated in the height direction (vertical direction) of the coil forming device 100.

Since the end portion of the split conductor forming the segment coil is welded with the other split conductor, the enamel film (insulating film) is necessarily removed in order to make the welding easy. Therefore, in this embodiment, the enamel film is removed in two direction of the edgewise and the flatwise.

The mold 142 is configured by a fixed mold 142-1 and a movable mold 142-2. The fixed mold 142-1 is configured by a pair of fixing units 142-1A and 142-1B and a conductor guiding stationary blade 142-1C provided in the center. The movable mold 142-2 is configured by a pair of movable blades 142-2A and 142-2B and a conductor pressing member 142-2C provided in the center. The conductor guiding stationary blade 142-1C includes edges 142-1*a* and 142-1*b*, and the movable blades 142-2A and 142-2B include the edges 142-2*a* and 142-2*b*.

The peeling device 140*a* cuts off an enamel film 1A of the long side (flatwise) by the edges 142-1*a* and 142-1*b* of the conductor guiding stationary blade 142-1C and the edges 142-2*a* and 142-2*b* of the movable blades 142-2A and 142-2B while moving the movable mold 142-2 toward the fixed mold 142-1. The peeled portion from which the enamel film 100A is cut is sent up to the position of the peeling device 140*b*, and then the short side (edgewise) of the enamel film 1A is cut off. In this way, the enamel film 1A is cut off to form the peeled portion at a predetermined interval in the continuously long linear conductor 1.

FIG. 21 illustrates the linear conductor 1 from which the enamel film is peeled. First, the enamel film of the flatwise is cut off by a peeling device 1*a* to form peeled portions 1001*a* and 1002*a*. During a period when the peeled portions 1001*a* and 1002*a* are formed, the enamel film of the edgewise is cut off by a peeling device 1*b* to form peeled portions 1001*b* and 1002*b*. The length of the peeled portions 1001*a* and 1002*a* is illustrated to be equal to that of the peeled portions 1001*b* and 1002*b* in FIG. 21, but normally both lengths may be different.

Herein, the description will be given about a peeling process using the peeling device 140*a* and the peeling device 140*b*.

In this embodiment, the amount of operation of a driven axis is set according to the amount of operation of a primary axis, and a phase control (also referred to as a synchronization control) is performed to control the operation of each axis. Further, the primary axis is set as a virtual axis, and the virtual axis is set on the basis of the amount of movement of the linear conductor. In this embodiment, the linear conductor 1 sets the virtual axis to be always conveyed at a constant speed.

Herein, a position coordinate of the peeling device 140*a*, a position coordinate of the peeling device 140*b*, a position coordinate of the movable mold 142-2 of the peeling device 140*a*, and a position coordinate of the movable mold 142-2 of the peeling device 140*b* are set as the driven axis. In the following description, a "synchronization mode" is a mode in which the peeling device 140*a* and the peeling device 140*b* move in synchronization with the virtual axis. In other words, the peeling device 140*a* and the peeling device 140*b* move in synchronization with the linear conductor 1 in the synchronization mode.

The peeling device 140*a* starts to move toward the conveyance direction of the linear conductor 1 from its initial position, causes the movable mold 142-2 to operate from an open position to a close position in the synchronization mode (at an equal speed to the linear conductor 1), and cuts off the enamel film of the flatwise of the linear conductor 1. At this time, the movable mold 142-2 bits the peeled portion (stepped portion) of the linear conductor 1 which is formed by being cut by the movable mold 142-2, and is strongly connected to the linear conductor 1. Therefore, the linear conductor 1 is interposed between the fixed mold 142-1 and the movable mold 142-2 of the peeling device 140*a*, and moves along the movement of the peeling device 140*a*. In other words, the linear conductor 1 is conveyed by the peeling device 140*a*. Further, the linear conductor 1 is conveyed while being interposed (constrained) by the fixed mold 142-1 and the movable mold 142-2 of the peeling device 140*b* until being interposed by the fixed mold 142-1 and the movable mold 142-2 of the peeling device 140*a*.

When the linear conductor 1 is interposed by the fixed mold 142-1 and the movable mold 142-2 of the peeling device 140*a*, the movable mold 142-2 of the peeling device 140*b* operates from the close position to the open position, and the linear conductor 1 is released from a state of being interposed (constrained) by the peeling device 140*b*.

During a period when the peeling device 140*a* conveys the linear conductor 1, the peeling device 140*b* moves to its initial position, and starts to move from the initial position toward the conveyance direction of the linear conductor 1. The peeling device 140*b* closes the movable mold 142-2 after entering the "synchronization mode". The peeling device 140*b* cuts off the enamel film of the edgewise of the linear conductor 1 by closing the movable mold 142-2. At this time, the movable mold 142-2 of the peeling device 140*b* bits the peeled portion (stepped portion) of the linear conductor 1 which is formed by being cut by the movable mold 142-2, and is strongly connected to the linear conductor 1. Therefore, the linear conductor 1 is interposed between the fixed mold 142-1 and the movable mold 142-2 of the peeling device 140*b*, and moves along the movement of the peeling device 140*b*. Further, at this stage, the linear conductor 1 is constrained by the peeling device 140*a*, and the peeling device 140*a*, the peeling device 140*b*, and the linear conductor 1 move at the equal speed.

In other words, the movable mold 142-2 of the peeling device 140*b* operates from the open position to the close position before the timing for the movable mold 142-2 of the peeling device 140*a* to operate from the close position to the open position. A period taken from that the movable mold 142-2 of the peeling device 140*b* starts to be closed until the movable mold 142-2 of the peeling device 140*a* is opened is a period when the peeling device 140*a* and the peeling device 140*b* both are in the synchronization mode with respect to the virtual axis. Therefore, the peeling device 140*a*, the peeling device 140*b*, and the linear conductor 1 move at the same speed together.

When the linear conductor 1 is interposed by the fixed mold 142-1 and the movable mold 142-2 of the peeling device 140*b*, the movable mold 142-2 of the peeling device 140*a* operates from the close position to the open position. When the movable mold 142-2 of the peeling device 140*a* is opened, the linear conductor 1 is released from the constraint by the fixed mold 142-1 and the movable mold 142-2 of the peeling device 140*a*. However, the linear conductor 1 is already constrained by the fixed mold 142-1 and the movable mold 142-2 of the peeling device 140*b* at this time point. Therefore, the linear conductor 1 is conveyed at a constant speed by the peeling device 140*b* even after being released from the constraint of the peeling device 140*a*.

The peeling device 140*a* returns to its initial position when the movable mold 142-2 is opened. The speed when the peeling device 140*a* returns to the initial position is set to be the highest speed. Therefore, a production efficiency of the split coil can be increased.

When the peeling device 140*a* returns to the initial position, the movement toward the conveyance direction of the linear conductor 1 starts again, and the peeling device is accelerated up to the synchronization mode. Hereinafter, the above operations are performed by reversing the roles of the peeling device 140*a* and the peeling device 140*b*.

At least any one of the peeling device 140*a* and the peeling device 140*b* is conveyed in the conveyance direction while being always constrained by the linear conductor 1. In addition, there is provided a period where the constraint of the linear conductor 1 by the peeling device 140*a* and the constraint of the linear conductor 1 by the peeling device 140*b* are overlapped when the constraint of the linear conductor 1 by the peeling device 140*a* and the constraint of the linear conductor 1 by the peeling device 140*b* are switched. Therefore, it is possible to securely convey the linear conductor 1 at a constant speed.

Since the movable mold of at least any one of the peeling device 140*a* and the peeling device 140*b* always necessarily abuts on the peeled portion of the linear conductor 1, the movable mold cannot abut on the same peeled portion by both the peeling devices 140*a* and 140*b*. Therefore, the movable mold of the peeling device 140*b* necessarily abuts on the peeled portion at a position separated by at least one split coil with respect to the peeled portion where the movable mold of the peeling device 140*a* abuts. However, when the peeled portion abutting on the movable mold of the peeling device 140*a* is separated from the peeled portion abutting on the movable mold of the peeling device 140*b*, the linear conductor 1 vibrates between the peeling device 140*a* and the peeling device 140*b*, and the conveyance is hardly made. Therefore, the peeled portion abutting on the movable mold of the peeling device 140*b* at the closest position between the peeling device 140*a* and the peeling device 140*b* is desirably formed at a position separated by one split coil from the peeled portion abutting on the movable mold of the peeling device 140*a*.

In this embodiment, the peeling device 140*a* and the peeling device 140*b* come into contact with the linear conductor 1 for the conveyance. However, the position where the peeling device 140*a* and the peeling device 140*b* come into contact with the linear conductor 1 is in a portion where the enamel film (insulating film) is cut off, and the peeling device 140*a* and the peeling device 140*b* do not come into contact with a portion where the enamel film (insulating film) is coated. In the uncoiler 110, the first roller 112*a* and the second roller 112*b* of the pinch roller device 112 come into contact with the portion where the enamel film (insulating film) of the linear conductor 1 is coated. However, since the pinch roller device 112 is not a device which actively conveys the linear conductor 1, the first roller 112*a* and the second roller 112*b* are necessarily strongly pushed with respect to the linear conductor 1. Therefore, it is possible to reduce a possibility that damage is caused in the enamel film and dust is attached to the enamel film.

Figure 9A:
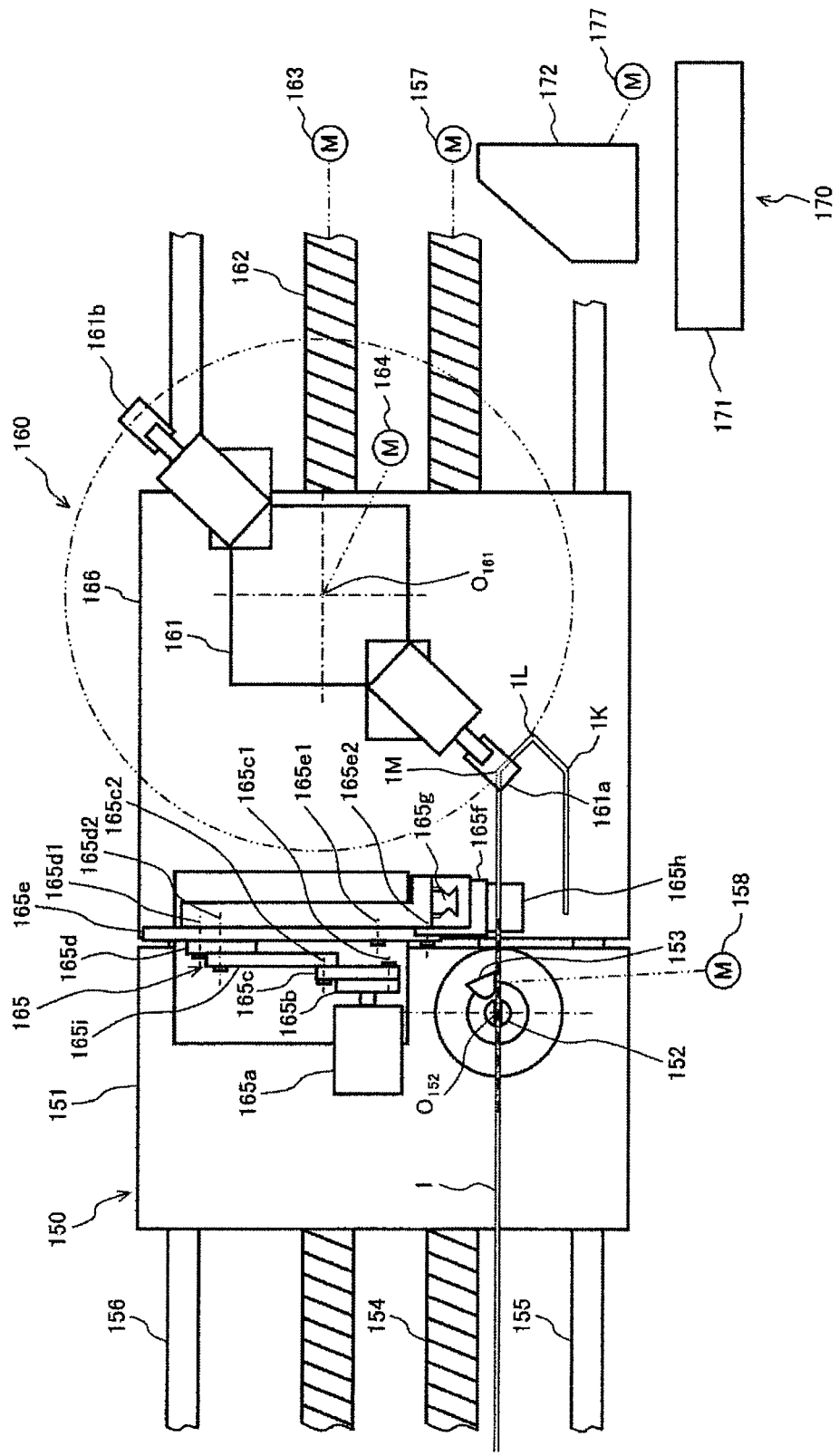
FIG. 9A is a plan view illustrating a configuration of a bending unit (bending device) 150 and a conveying unit (conveying device) 160.
Figure 9B:
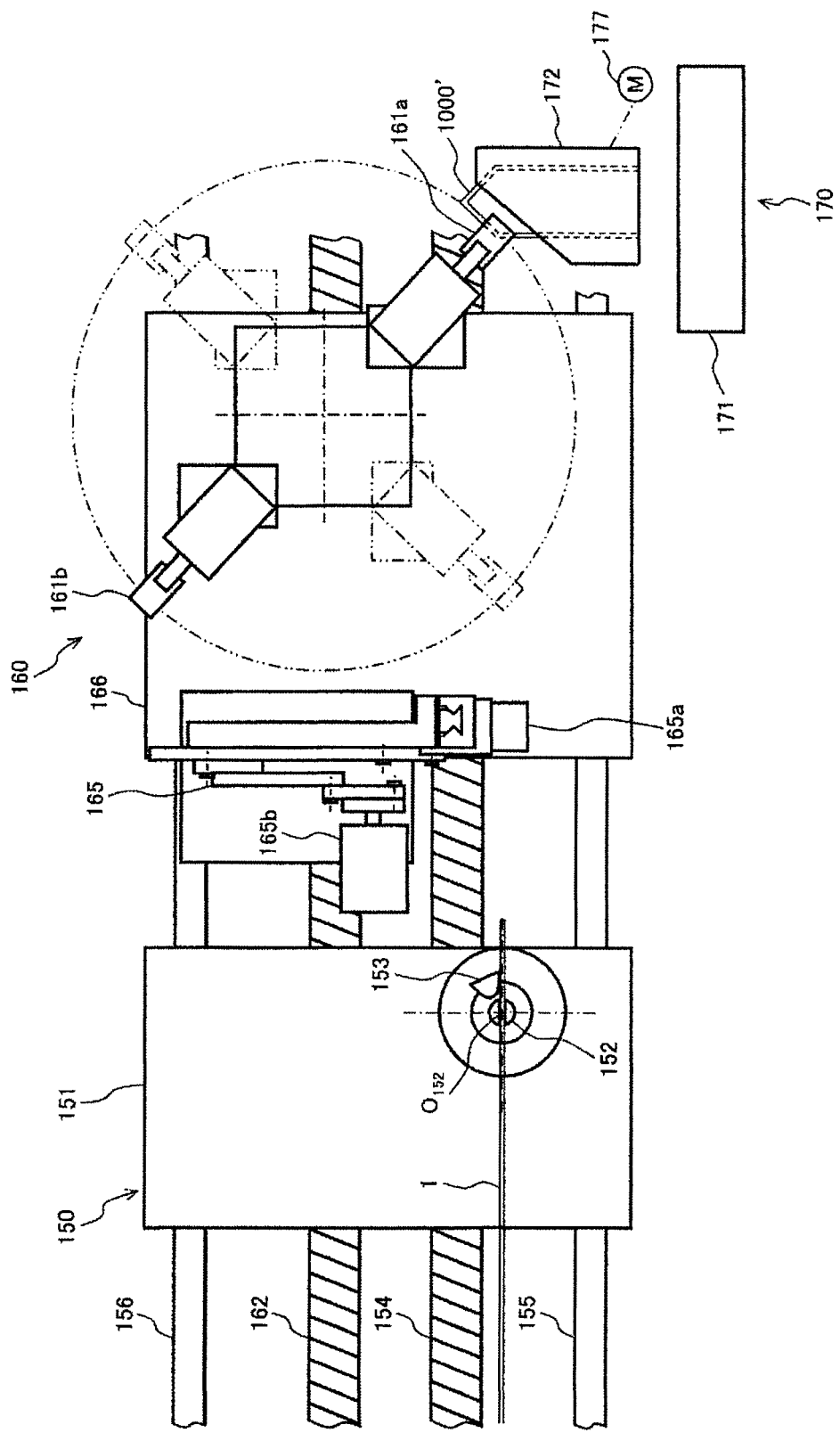
FIG. 9B is a diagram for describing a conveying operation by the conveying unit (conveying device) 160.
Figure 10:
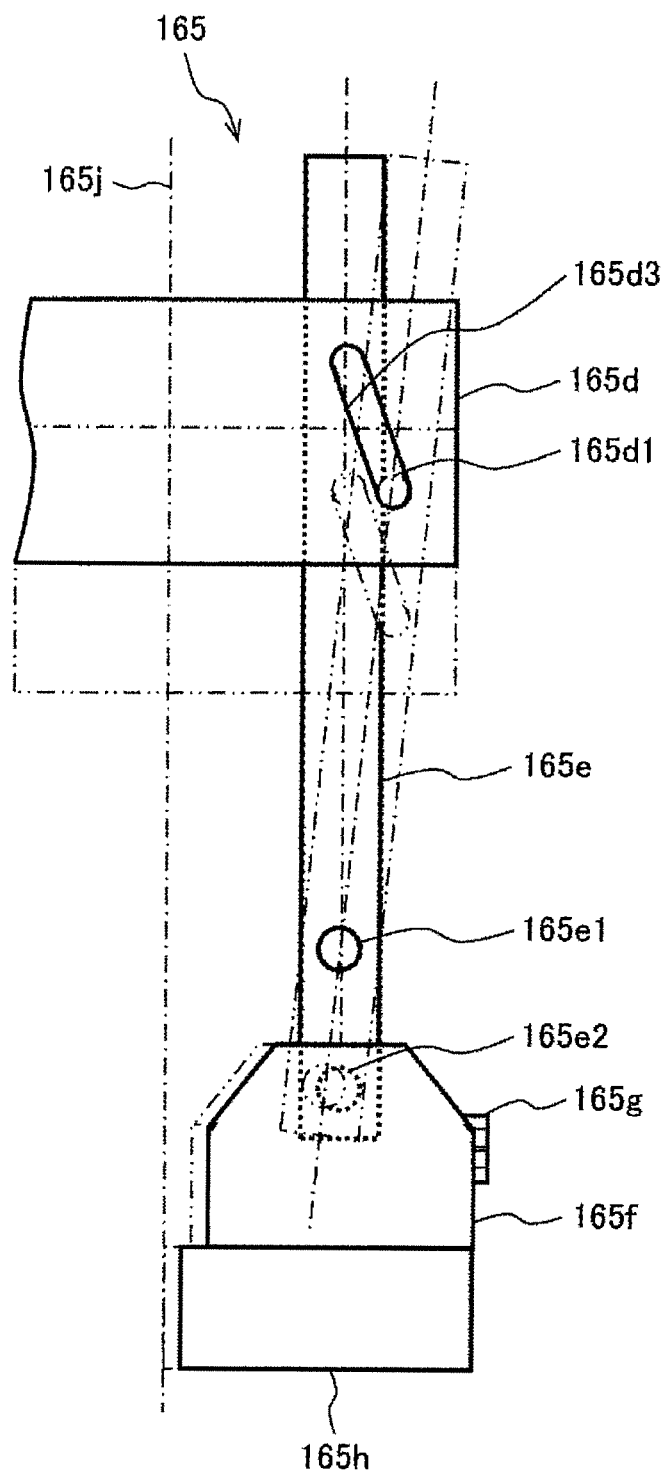
FIG. 10 is a plan view illustrating a configuration of a cutting device 165 of a linear conductor 1.

Next, the description will be given about the bending unit (bending device) 150 and the conveying unit (conveying device) 160 using FIGS. 9A, 9B, 9C, and 10. FIG. 9A is a plan view illustrating a configuration of the bending unit (bending device) 150 and the conveying unit (conveying device) 160. FIG. 9B is a diagram for describing a conveying operation of the conveying unit (conveying device) 160. FIG. 9C is a plan view illustrating the bending unit (bending device) 150 on a magnified scale. FIG. 10 is a plan view illustrating a configuration of a cutting device 165 of the linear conductor 1.

The bending unit (bending device) 150 includes a base 151, a core metal 152 mounted in the base 151, and a bending pin 153. In addition, a thermomotor 158 is provided on the rear side of the base 151, and the bending pin 153 is configured to rotate about the center $O_{152}$ of the core metal 152 by the thermomotor 158. In other words, the bending process is performed on the linear conductor 1 while the bending pin 153 rotates around the core metal 152. Further, the core metal 152 is fixed to the base 151.

In this embodiment, the bending device 150 performs the bending process three times on the linear conductor 1. Through three times of the bending process, three bent portions 1K, 1L, and 1M are formed in the linear conductor 1. In this stage, the linear conductor 1 is two-dimensionally bent.

Herein, the core metal 152 and the bending pin 153 will be described in detail with reference to FIG. 9C. In this embodiment, the core metal 152 is formed in a cylindrical shape, and a straight groove 152*a* is formed in the center through which the linear conductor 1 is inserted. The core metal 152 is formed with round portions 152*b* on both ends of the straight groove 152*a*. Therefore, the enamel film of the linear conductor 1 is prevented from being damaged at the time of the bending process.

In addition, the bending pin 153 is formed in a shape which has a partially cylindrical surface 153*a* and a straight portion (flat surface portion) 153*b* abutting on the linear conductor 1 with respect to the partially cylindrical surface 153*a*. With such a shape, the bending pin 153 abuts on the linear conductor 1 from the straight portion (flat surface portion) 153*b* when abutting on the linear conductor 1. Then, the straight portion (flat surface portion) 153*b* abuts on the linear conductor 1 to apply a bending force to the linear conductor 1 at the time of the bending process. When the bending force is applied by making a cylindrical pin having a small diameter abut on the linear conductor 1, an impression is easily made in the linear conductor 1, and the enamel film is easily damaged. In this embodiment, since the straight portion (flat surface portion) 153*b* abuts on the linear conductor 1, the impression is hardly made in the linear conductor 1, and the enamel film is hardly damaged. Therefore, a larger bending force can be applied to the linear conductor 1 at a high speed, and thus a processing time required for the bending process can be shortened.

The base 151 of the bending device 150 is movable in both directions on the upstream and downstream sides along the conveyance direction of the linear conductor 1 by a rod screw 154 and a servo motor 157 rotatably driving the rod screw 154.

The conveying unit (conveying device) 160 includes a base 166, a conveyance actuator 161 mounted in the base 166, and the cutting device 165 of the linear conductor 1. In addition, a thermomotor 164 is mounted on the rear side of the base 166. The conveyance actuator 161 is configured to rotate about the center $O_{161}$ by the thermomotor 164. Two chucks 161*a* and 161*b* are provided in the conveyance actuator 161 to be symmetrical about a point with respect to the center $O_{161}$ and to be in an interval of 180 degrees.

When the two-dimensional bending process ends, a split coil 1000' is cut off from the linear conductor 1 by the cutting device 165. The cutting device 165 includes a cutting blade (cutter) 165*h* which is driven by a crank mechanism (cutting crank) 165 as illustrated in FIG. 9A.

The crank mechanism 165 includes a disk 165*b* which is attached to a rotation shaft of a servo motor 165*a*, a first arm 165*c* of which one end portion is connected to a position decentered from the rotation center of the disk 165*b* by a connecting pin 165*c*1, a second arm 165*i* of which the end portion is connected to the other end portion of the first arm 165*c* by a connecting pin 165*c*2, and a guide member 165*d* which is connected to the other end portion of the second arm 165*i* by a connecting pin 165*d*2.

When the rotation shaft of the servomotor 165*a* rotates, the guide member 165*d* moves up and down while the second arm 165*i* swings about the connecting pin 165*d*2. In the guide member 165*d*, as illustrated in FIG. 10, a guide groove (inclined groove) 165*d*3 is formed to be inclined with respect to the vertical direction. A third arm 165*e* illustrated in FIG. 10 includes an engaging pin 165*d*1 which is engaged to the guide groove 165*d*3. In addition, the third arm 165*e* can swing about a connecting pin 165*e*1. Therefore, while the guide member 165*d* moves up and down, the engaging pin 165*d*1 is guided to the guide groove 165*d*3 and moves in the right and left direction. Therefore, the third arm 165*e* swings about the connecting pin 165*e*1. With this swinging, the third arm 165*e* moves horizontally (width direction) a moving member 165*f* connected to the opposite side of the engaging pin 165*d*1 through the connecting pin 165*e*1.

The moving member 165*f* is guided in the horizontal direction (width direction) by a guide rail 165*g*. The third arm 165*e* moves the cutting blade (cutter) 165*h* attached to the moving member 165*f* in the horizontal direction (width direction) by this swinging. While only one side is illustrated in FIG. 10, the third arm 165*e*, the moving member 165*f*, the guide rail 165*g*, and the cutting blade (cutter) 165*h* are symmetrically configured on the left side of a center line 165*j*, and a linear wire 1 is cut by two cutting blade (cutter) 165*h* symmetrically configured with the center line 165*j* interposed therebetween.

The base 166 of the conveying device 160 is movable in both directions on the upstream and downstream sides along the conveyance direction of the linear conductor 1 by a rod screw 162 and a servo motor 163 which rotatably drives the rod screw 162.

The chucks 161a and 161b hold the split coil 1000' before the split coil 1000' is cut from the linear conductor 1 by the cutting device 165. When the chuck 161a holds the split coil 1000', the conveyance actuator 161 rotates about the center $O_{161}$ as illustrated in FIG. 9B. In addition, the base 166 horizontally moves on the downstream side in the conveyance direction of the linear conductor 1 by the rod screw 162 and the servo motor 163. Therefore, the split coil 1000' is conveyed up to a coil insertion guide 172 of the pressing unit (press device) 170.

A servo motor 177 is provided in the coil insertion guide 172, and is configured to change a gap between both side plates of the guide. When the split coil 1000' is conveyed in by the rotation of the conveyance actuator 161 and the movement of the base 166, the gap between both side plates of the coil insertion guide 172 is expanded by the servo motor 177. Therefore, the conveyance actuator 161 can securely insert the split coil 1000' in a mold 171 of the press device 170 through the coil insertion guide 172.

Herein, the description will be given about the phase control (synchronization control) of the bending device 150, the cutting device 165, and the conveying device 160.

Figure 20:
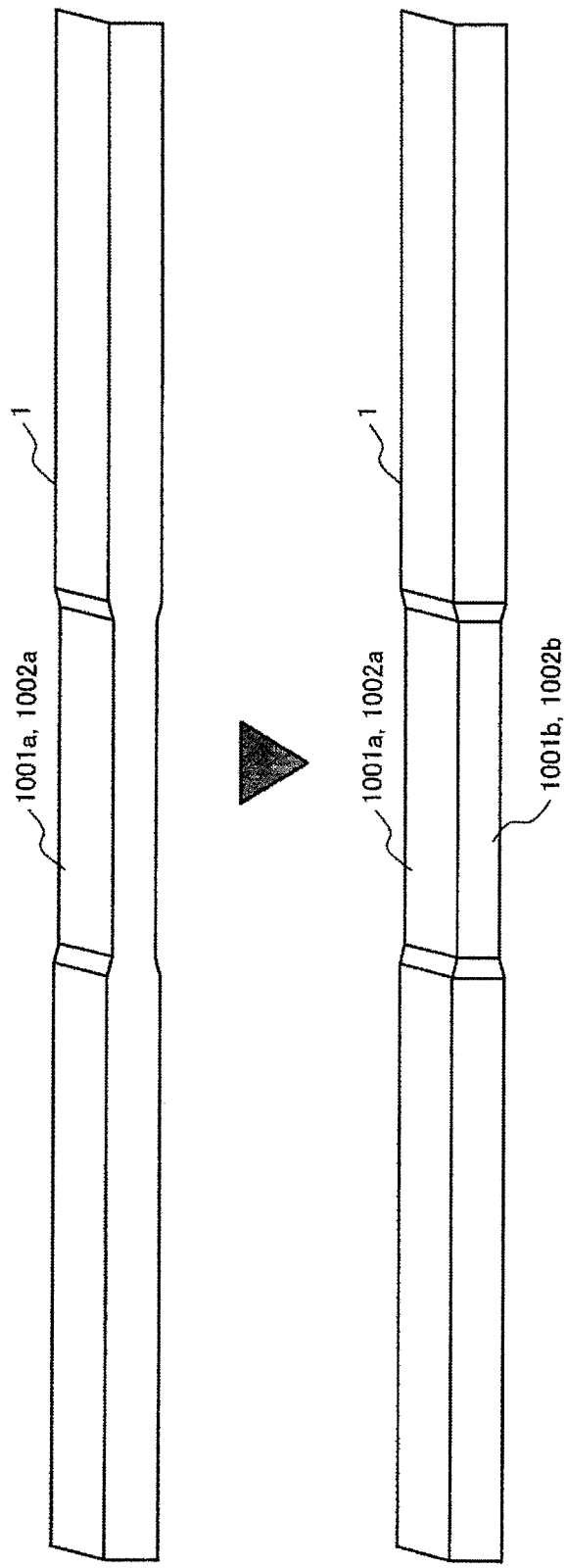
FIG. 20 is a diagram illustrating the linear conductor 1 from which the enamel film is peeled.

The following driven axes will be set in the phase control of the bending device 150, the cutting device 165, and the conveying device 160. As a first driven axis, the movement (position coordinate) of the base 151 of the bending device 150 is set. The servomotor 157 is controlled along the driven axis. As a second driven axis, the rotation (rotation coordinate) of the bending pin 153 is set. The thermomotor 158 is controlled along the driven axis. As a third driven axis, the movement (position coordinate) of the base 166 of the conveying device 160 is set. The servo motor 163 is controlled along the driven axis. As a fourth driven axis, the operation (rotation coordinate) of the cutting crank mechanism 165 is set. The servomotor 165a is controlled along the driven axis. As a fifth driven axis, the rotation (rotation coordinate) of the conveyance actuator 161 is set. The servo motor 164 is controlled along the driven axis. As a sixth driven axis, opening/closing of the chucks 161a and 161b are set. A valve 161v (see FIG. 20) of the chucks 161a and 161b is controlled along the driven axis. As a seventh driven axis, the operation (position coordinate) of the coil insertion guide 172 is set. The servo motor 177 is controlled along the driven axis. The above-described respective driven axes are described with the above virtual axis as the primary axis.

In the bending device 150, the base 151 of the bending device 150 is sent in synchronization with the sending of the linear conductor 1. In the "bending" operation of the bending device 150, there are three "bending synchronization modes". In each "bending synchronization mode", "bending operation" and "returning operation" are performed. In other words, the "bending operation" (bending process) is performed while sending the base 151 of the bending device 150 in synchronization with the linear conductor 1, and the sending is decelerated at every "bending operation" to perform the "returning operation". The reason why the base 151 of the bending device 150 is decelerated at every bending operation is to relatively send the linear conductor 1 to the front side of the base 151 therebetween. Therefore, in the "returning operation", the bending device 150 does not move in synchronization with the linear conductor 1.

In practice, even in the period of the "bending operation", the decelerating of the base 151 is slightly delayed from the speed of the linear conductor 1 in the middle of performing the bending process. Therefore, the linear conductor 1 is fed slightly forward with respect to the core metal 152. The linear conductor 1 can be prevented or suppressed from extending between the core metal 152 and the rotating bending pin 153.

When three bending processes end, the bending device 150 returns up to the initial position (acceleration start position in synchronization) at a maximum speed. Meanwhile, the bent portion 1M (see FIG. 9B) is fed forward with respect to the core metal 152. In this case, the feeding is based on a relation between the core metal 152 and the linear conductor 1, and the linear conductor 1 always moves at a constant speed. After returning to the initial position, the base 151 of the bending device 150 is accelerated to enter the synchronization mode, and moves at a speed in synchronization with the linear conductor 1. Herein, a servo motor 165b of the cutting device 165 is accelerated to cut the linear conductor 1.

On the other hand, the conveying device 160 moves the base 166 to a position to insert the split coil 1000' into the coil insertion guide 172 and is on standby during the three bending processes of the bending device 150. The base 151 of the bending device 150 performs the bending process while moving toward the conveying device 160 during the three bending processes. Since the base 166 of the conveying device 160 is on standby at the position to insert the split coil 1000' into the coil insertion guide 172, the conveying device 160 does not hinder the movement of the bending device 150.

When the bending device 150 ends the three bending processes, the base 166 of the conveying device 160 is controlled to return up to the initial position (acceleration start position in synchronization) at the maximum speed. When the three bending processes end, the base 151 of the bending device 150 also returns to the initial position (acceleration start position in synchronization) at the maximum speed. The timing for the base 166 of the conveying device 160 to start to move toward the initial position is earlier than the timing for the base 151 of the bending device 150 to start to move toward the initial position.

The base 166 of the conveying device 160 moves longer than the base 151 of the bending device 150, and reaches the initial position of the base 166 of the conveying device 160 at the same timing as that when the base 151 of the bending device 150 reaches the initial position. After reaching the initial positions, the base 166 of the conveying device 160 and the base 151 of the bending device 150 are accelerated again and move to the synchronization mode together. In other words, the base 166 of the conveying device 160 and the base 151 of the bending device 150 move at the same speed as that of the linear conductor 1 in the approached state. In the synchronization mode, a rotation coordinate of the cutting crank mechanism 165 is set such that the cutting crank mechanism 165 cuts the split coil 1000' from the linear conductor 1.

In the conveying device 160, the conveyance actuator 161 is set to rotate such that the air chucks 161a and 161b are located at positions where the split coil 1000' cut from the linear conductor 1 is inserted into the coil insertion guide 172. The rotation of the conveyance actuator 161 is performed in parallel with the movement toward the press insertion position (a position where the split coil 1000' is inserted into the coil insertion guide 172) by the base 166 of the conveying device 160. When the air chucks 161a and 161b are located at positions where the split coil 1000' is inserted into the coil insertion guide 172, the air chuck is switched from "close" to "open", and the split coil 1000' is inserted into the coil insertion guide 172.

In addition, in the conveying device 160, an operation of locating the air chucks 161a and 161b at positions (cutting position) where the split coil 1000' cut from the linear coil 1 is held is set in parallel with the operation that the base 166 returns up to the initial position (acceleration start position in synchronization). The operation of the conveying device 160 is set such that the air chucks 161a and 161b completely hold (open→close) the split coil 1000' during a period when the split coil 1000' is cut from the linear coil 1 after the air chucks 161a and 161b arrive at the cutting position.

In the coil insertion guide 172, the coil insertion guide 172 is set to the open state (a state where both side plates are opened) before the air chucks 161a and 161b holding the split coil 1000' start to rotatably move toward the press insertion position by the conveyance actuator 161, and the air chucks 161a and 161b are switched from "open" to "close" when arriving at the press insertion position. In addition, the coil insertion guide 172 is set to be switched from "close" to "open" in parallel with the operation that the air chucks 161a and 161b rotatably move up to the cutting position by the conveyance actuator 161.

Figure 11:
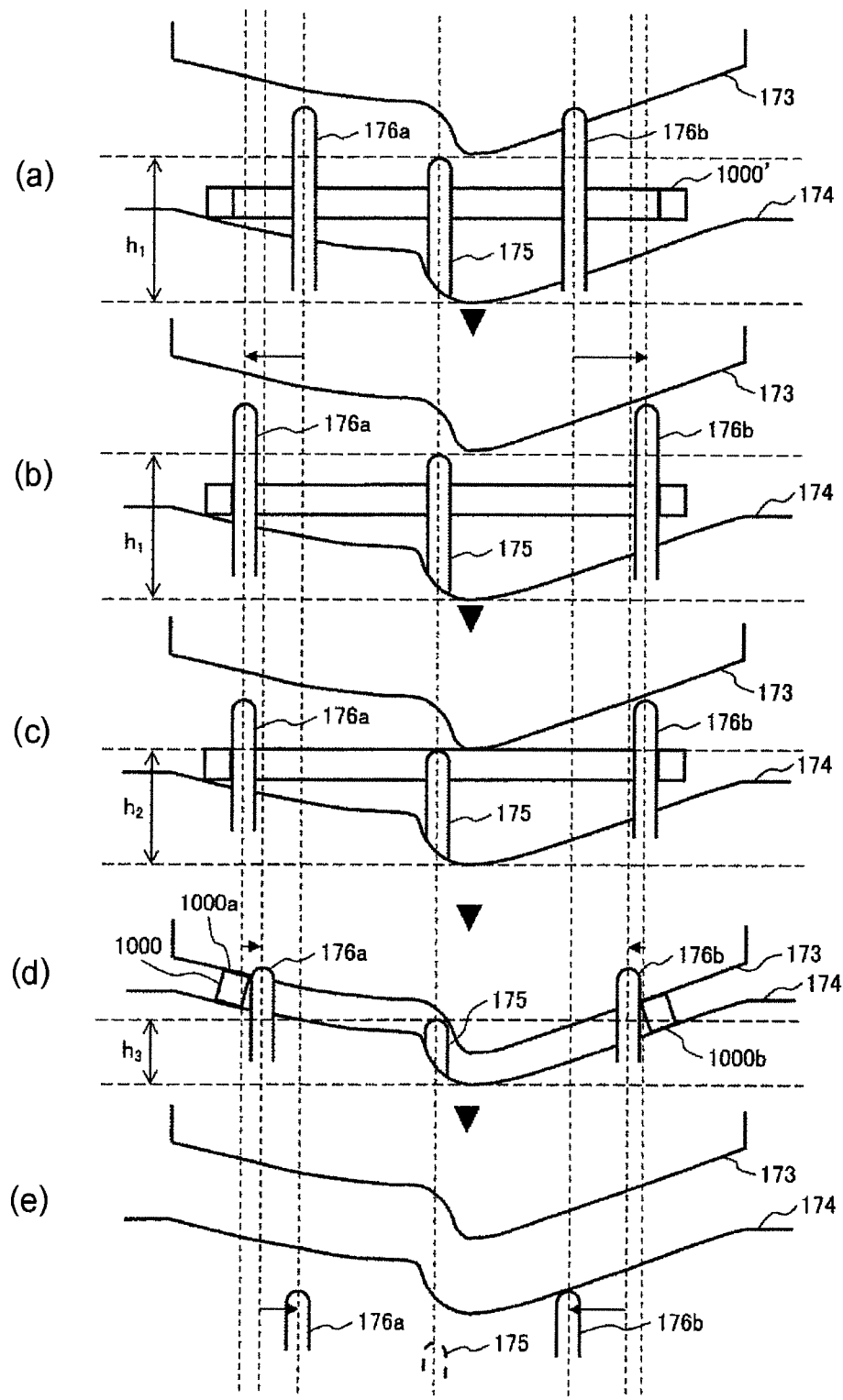
FIG. 11 is a conceptual diagram of operations illustrated in an order of operations of a press device 170.

Next, the description will be given about the pressing unit (press device) 170 using FIG. 11. FIG. 11 is a conceptual diagram of operations illustrated in an order of operations of the press device 170.

The press device 170 includes a fixed mold 174 and a movable mold 173. FIG. 11 illustrates a state of the fixed mold 174 and the movable mold 173 when viewed from the lower side. The fixed mold 174 is provided with three pins which protrude toward a gap formed with respect to the movable mold 173. One of the three pins is located above compared to the other two pins, and positioned between the other two pins when being projected onto a horizontal plane. One pin 175 located above is called a first pin 175, and the other two pins 176a and 176b are called second pins 176a and 176b or posture pins 176a and 176b.

The first pin 175 protrudes from a mold surface (press surface) of the fixed mold 174. On the other hand, the second pins (posture pins) 176a and 176b are provided below the mold surface of the fixed mold 174.

Hereinafter, the operation of the press device 170 will be described with reference to FIG. 11. In the press device 170, there are provided four driven axes in which the above-described virtual axis is set as the primary axis. Further, the axis of the "coil insertion guide" may be included in the press device 170. In this case, the press device 170 is configured by five driven axes.

Figure 19:
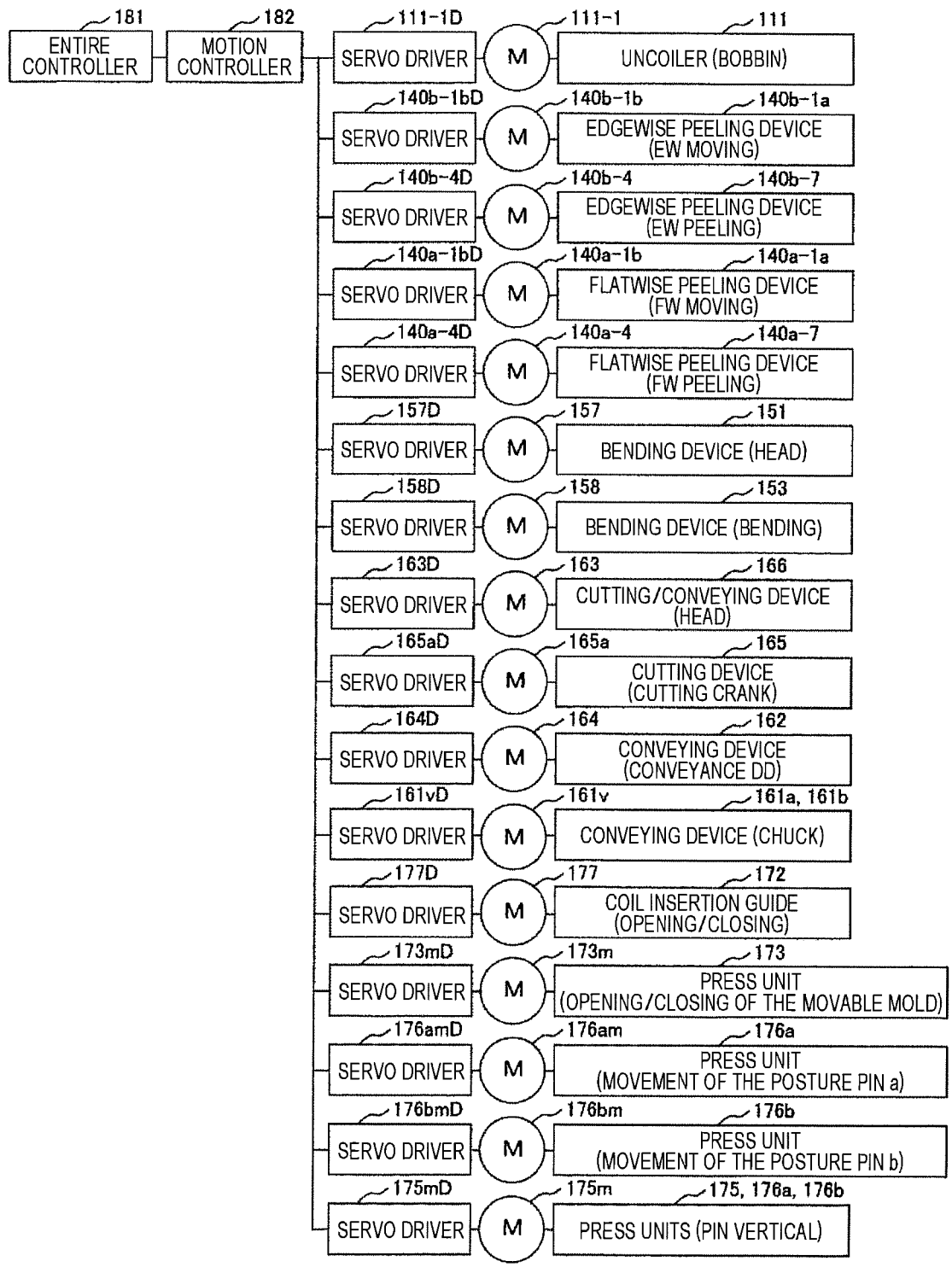
FIG. 19 is a block diagram of a phase control.

The first driven axis is an axis to open or close the movable mold 173 of a press unit 170, and controlled by a servo motor 173m (see FIG. 19). The second and third driven axes are axes to move two posture pins (posture pin a and posture pin b) of the press unit 170 in the horizontal direction and in a direction of the gap between two posture pins (a direction perpendicular to the moving direction of the movable mold 173), and controlled by servo motors 176am and 176bm (see FIG. 19). The fourth driven axis is an axis (hereinafter, referred to a rising axis or a falling axis) to push or pull the first pin 175 and the second pins (posture pin) 176a and 176b of the press unit 170 from the mold surface to the movable mold 173 with respect to the position in the horizontal direction of the mold surface (press surface) of the fixed mold 174, and is controlled by a servo motor 175m (see FIG. 19). Further, the first pin 175 and the posture pins 176a and 176b are integrally raised (or fallen) by the servo motor 175m. In other words, the rising or falling axis of the first pin 175 and the posture pins 176a and 176b is configured by one axis.

FIG. 11(a) illustrates a state where the movable mold 173 is completely opened with respect to the fixed mold 174. In this state, the press is completely retracted. The press retracting is an operation of moving the movable mold 173 to be completely opened. In addition, the operation of raising the pin is set immediately before the press retracting is completed. This pin raising is an operation in which the first pin 175 and the posture pins 176a and 176b move from the state of being pulled from the mold surface of the fixed mold 174 as illustrated in FIG. 11(e) to the state of being completely protruding from the mold surface of the fixed mold 174 as illustrated in FIG. 11(a).

As illustrated in FIG. 11(a), the split coil 1000' is inserted from the air chucks 161a and 161b of the conveyance actuator 161 to the press unit 170 in a state where the movable mold 173, the first pin 175, and the posture pins 176a and 176b are set. This process is performed by the operation of switching the air chucks 161a and 161b from "close" to "open". At the time of inserting the split coil 1000' into the press unit 170, two posture pins 176a and 176b come closest to the first pin 175 on a projection onto the horizontal plane, and a gap between two posture pins 176a and 176b is made narrow in order not to cause interference between the split coil 1000' and the posture pins 176a and 176b. Further, the first pin 175 and the posture pins 176a and 176b at this time protrude from the mold surface of the fixed mold 174 at a maximum. At this time, the height from a reference surface of the first pin 175 is $h_1$.

In FIG. 11(b), the gap between two posture pins 176a and 176b is expanded at a maximum, and the split coil 1000' is supported in a stable state (posture) by the first pin 175 and the posture pins 176a and 176b. After the split coil 1000' is inserted into the press unit 170, the state is shifted from the state of FIG. 11(a) to the state of FIG. 11(b). This operation is performed by a pin opening of the second pins (posture pin) 176a and 176b. Further, in the state of FIG. 11(b), the height from the reference surface of the first pin 175 is $h_1$.

In FIG. 11(c), the movable mold 173 starts to move in a closing direction (toward the fixed mold 174). This is an operation of moving the press forward in the press molding. In other words, the pressing process starts in this stage. However, in FIG. 11(c), the movable mold 173 has just abutted on the split coil 1000', and there occurs no deformation in the split coil 1000' by the pressing process.

The reason why there is a need to pay attention in process of shifting the state from FIG. 11(b) to FIG. 11(c) is that the first pin 175 and the posture pins 176a and 176b fall down in order to avoid the interference with the movable mold 173 which comes close. At this time, the height from the reference surface of the first pin 175 is $h_2$, and $h_1$ and $h_2$ have a relation of $h_1 > h_2$. The falling control of the first pin 175 and the posture pins 176a and 176b is performed by setting "operate pin in synchronization with press molding" of a "press pin vertical" axis of FIG. 9B.

In FIG. 11(d), the movable mold 173 is completely closed to end the pressing process. In this state, the bending process is three-dimensionally performed on the split coil 1000' on which the bending process is two-dimensionally performed. In this state, the split coil 1000 is completed.

The reason why there is a need to pay attention in process of shifting the state from FIG. 11(c) to FIG. 11(d) is that the gap between both legs 1000a and 1000b of the U-shaped split coil 1000 becomes narrow by three-dimensionally performing the bending process on the split coil 1000'. Therefore, in the state of FIG. 11(*d*), the gap between two posture pins 176*a* and 176*b* becomes narrow compared to the state of FIG. 11(*c*). A gap control of the two posture pins 176*a* and 176*b* is performed by controlling the posture pin in synchronization with the press molding.

The movable mold 173 comes closer to the first pin 175 and the posture pins 176*a* and 176*b* even in process of shifting the state from FIG. 11(*c*) to FIG. 11(*d*). Therefore, the first pin 175 and the posture pins 176*a* and 176*b* are subjected to the falling control still more in order to avoid the interference with the movable mold 173. At this time, the height from the reference surface of the first pin 175 is $h_3$, and $h_1$, $h_2$, and $h_3$ have a relation of $h_1 > h_2 > h_3$.

In FIGS. 11(*b*) to (*d*), the press molding is not yet performed, and the falling control of the first pin 175 and the posture pins 176*a* and 176*b* and the gap control between the two posture pins 176*a* and 176*b* are different in timing and speed by a contact timing between the split coil 1000' and the movable mold 173 and a three-dimensional bending shape. Therefore, the gap control between the two posture pins 176*a* and 176*b* may be performed by appropriately changing the timing and speed in the three-dimensional bending process. In addition, the falling control of the first pin 175 and the posture pins 176*a* and 176*b* may be appropriately changed by a contact timing with respect to the movable mold 173.

In FIG. 11(*e*), the movable mold 173 is opened, and the split coil 1000 bent in a three dimensional manner is discharged from the mold of the press unit 170. Therefore, the first pin 175 and the posture pins 176*a* and 176*b* are subjected again to the falling control from the state of FIG. 11(*d*), and the first pin 175 and the posture pins 176*a* and 176*b* are completely pulled from the mold surface of the fixed mold 174 on a projection onto the horizontal plane. This operation is performed by the falling operation of the first pin 175 and the posture pins 176*a* and 176*b*. In addition, the gap between the two posture pins 176*a* and 176*b* returns to the state of FIG. 11(*a*).

When the falling control of the first pin 175 and the posture pins 176*a* and 176*b* and the gap control between the two posture pins 176*a* and 176*b* end, the movable mold 173 is opened. Therefore, the split coil 1000 bent in three-dimensional manner is discharged from the mold of the press unit 170. This operation is performed when the press is retracted.

As described above, in this embodiment, the operation of each driven axis is performed in synchronization with a sending speed (constant) of the linear conductor 1 in the virtual axis (primary axis). Since there is no control of starting the next operation after it is confirmed that the positioning in each driven axis is completed, the molding process of the coil can be performed at a high speed as that much.

In addition, in this embodiment, a peeling mold of the peeling device 140 conveys the linear conductor 1 while constraining (holding) the peeled portion of the enamel film of the linear conductor 1. Therefore, there hardly occurs sliding and positional deviation between the peeling device 140 (the feeding mechanism (conveying mechanism) of the linear conductor 1) and the linear conductor 1. Therefore, the linear conductor 1 can be accurately sent according to the virtual axis, and the coil can be accurately and exactly mold in the phase control (synchronization control) as described.

Figure 18A:
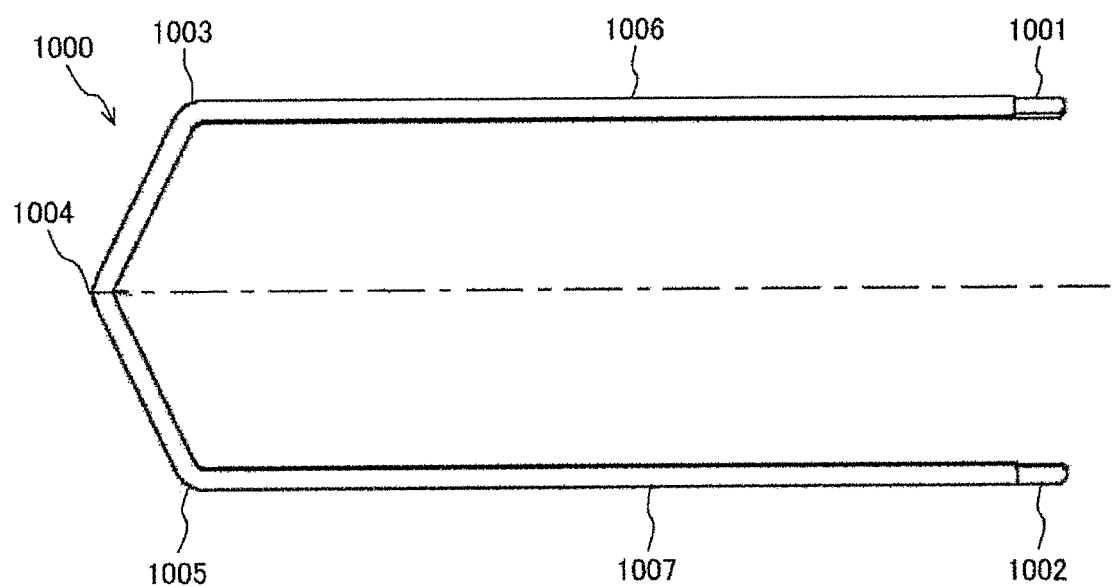
FIG. 18A is a plan view illustrating a shape of the split coil 1000.

Herein, the description will be given about an example of the split coil which is three-dimensionally bent by the coil forming device using FIGS. 18A and 18B. FIG. 18A is a plan view illustrating a shape of the split coil 1000. FIG. 18B is a plan view of the split coil 1000 of FIG. 18A when viewed from the right side.

The split coil 1000 of this embodiment is formed in a U shape, and three bent portions 1003 to 1005 are formed between both legs 1006 and 1007. The bent portions 1003 to 1005 two-dimensionally formed in three places as illustrated in FIG. 18A are processed by the bending device 150.

In the bending device 150, the bending pin 153 having a cylinder portion 153*a* and the flat surface portion 153*b* is used as a bending pin. Therefore, the impression hardly occurs in the abutting portion of the bending pin 153 in the linear conductor 1. In addition, when the bending process is performed, a moving speed of the bending device 150 is slightly delayed with respect to the sending speed of the linear conductor 1. Therefore, it is possible to prevent or suppress that the linear conductor 1 extends between the core metal 152 and the rotating bending pin 153. Therefore, according to this embodiment, it is possible to provide the linear conductor 1 which has no impression and no scratch in the base portion of both legs 1006 and 1007.

The configuration of the servo motor which performs the phase control will be described using FIG. 19. FIG. 19 is a block diagram of the phase control.

A motion controller 182 is provided below the entire controller 181. The servo motor forming the driven axis and a servo driver thereof are connected below the motion controller 182. In this embodiment, there are provided 16 driven axes in total such as an uncoiler (bobbin) 111, an edgewise peeling device (EW moving) 140*b*-1*a*, an edgewise peeling device (EW peeling) 140*b*-7, a flatwise peeling device (FW moving) 140*a*-1*a*, a flatwise peeling device (FW peeling) 140*a*-7, a bending device (head) 151, a bending device (bending) 153, a cutting/conveying device (head) 166, the cutting device (cutting crank) 165, the conveying device (conveyance DD) 162, the conveying devices (chuck) 161*a* and 161*b*, the coil insertion guide (opening/closing) 172, a press unit (opening/closing of the movable mold) 173, a press unit (movement of the posture pin a) 176*a*, a press unit (movement of the posture pin b) 176*b*, and press units (pin vertical) 175, 176*a*, and 176*b*.

A servo driver 111-1D and the servo motor 111-1 are provided in the uncoiler (bobbin) 111, a servo driver 140*b*-1*b*D and the servo motor 140*b*-1*b* are provided in the edgewise peeling device (EW moving) 140*b*-1*a*, a servo driver 140*b*-4D and the servo motor 140*b*-4 are provided in the edgewise peeling device (EW peeling) 140*b*-7, the servo driver 140*a*-1*b*D and the servo motor 140*a*-1*b* are provided in the flatwise peeling device (FW moving) 140*a*-1*a*, a servo driver 140*a*-4D and the servo motor 140*a*-4 are provided in the flatwise peeling device (FW peeling) 140*a*-7, a servo driver 157D and the servo motor 157 are provided in the bending device (head) 151, a servo driver 158D and the servo motor 158 are provided in the bending device (bending) 153, a servo driver 163D and the servo motor 163 are provided in the cutting/conveying device (head) 166, a servo driver 165*a*D and the servo motor 165*a* are provided in the cutting device (cutting crank) 165, a servo driver 164D and the servo motor 164 are provided in the conveying device (conveyance DD) 162, a servo driver 161*v*D and the servo motor 161*v* are provided in the conveying device (chuck) 161*a* and 161*b*, a servo driver 177D and the servo motor 177 are provided in the coil insertion guide (opening/closing) 172, a servo driver 173*m*D and the servo motor 173*m* are provided in the press unit (opening/closing of the movable mold) 173, a servo driver 176*am*D and the servo motor 176*am* are provided in the press unit (movement of the posture pin a) 176a, a servo driver 176bmD and the servo motor 176bm are provided in the press unit (movement of the posture pin b) 176b, and a servo driver 175mD and the servo motor 175m are provided in the press units (pin vertical) 175, 176a, and 176b.

Second Embodiment

Figure 12:
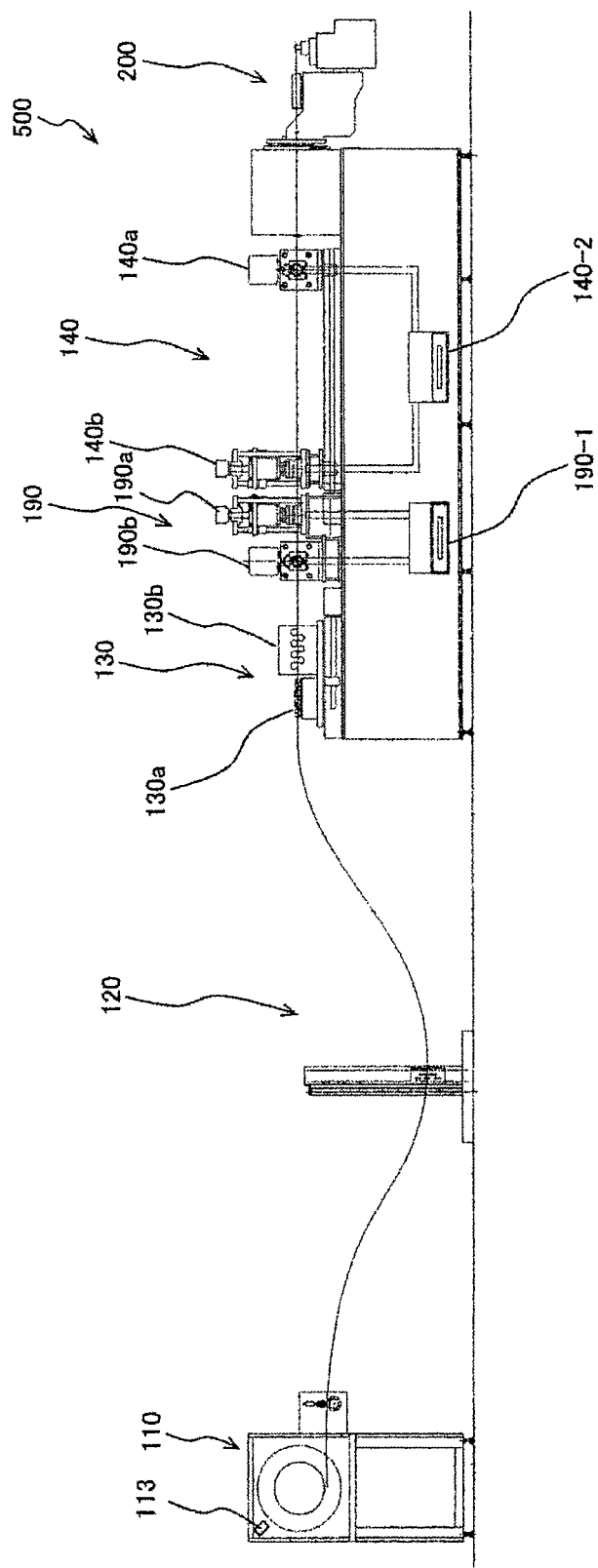
FIG. 12 is a plan view illustrating the entire configuration of a deformed-coil forming device according to an embodiment of the invention.

The entire configuration of a deformed-coil forming device according to the invention will be described using FIG. 12. FIG. 12 is a plan view illustrating the entire configuration of the deformed-coil forming device according to this embodiment.

A deformed-coil forming device 500 includes the uncoiler 110, the buffer 120, the correction unit (correction device) 130, a second peeling unit (peeling device) 190, a first peeling unit (peeling device) 140, and a bending unit (bending device) 200 from the left side of FIG. 12, all of which are disposed on a straight line in this order to perform processes on the linear conductor 1.

This embodiment is the same as that of the first embodiment except the second peeling unit (peeling device) 190 and the bending unit (bending device) 200. Therefore, the conveyance of the linear conductor 1 by the first peeling unit (peeling device) 140 is also the same as that of the first embodiment. While the conveyance of the linear conductor 1 by the first peeling unit (peeling device) 140 and the bending process of the bending device 150 are controlled by the phase control in the first embodiment, the phase control is not performed in this embodiment. Even in this embodiment, with the feeding mechanism in the bending device 200, the conveyance of the linear conductor 1 by the first peeling unit (peeling device) 140 and the bending process by the bending device 150 can be controlled by the phase control similarly to the bending device 150 of the first embodiment.

In this embodiment, the second peeling unit (peeling device) 190 is provided by providing a peeled portion in the middle of the split coil. The second peeling unit (peeling device) 190 includes a peeling device 190a which peels the enamel film of the flatwise, and a peeling device 190b which peels the enamel film of the edgewise similarly to the first peeling unit (peeling device) 140. However, the peeling device 190a and the peeling device 190b are fixed at positions, and thus not able to move in the conveyance direction of the linear conductor 1 unlike the peeling device 140a and the peeling device 140b.

Figure 13A:
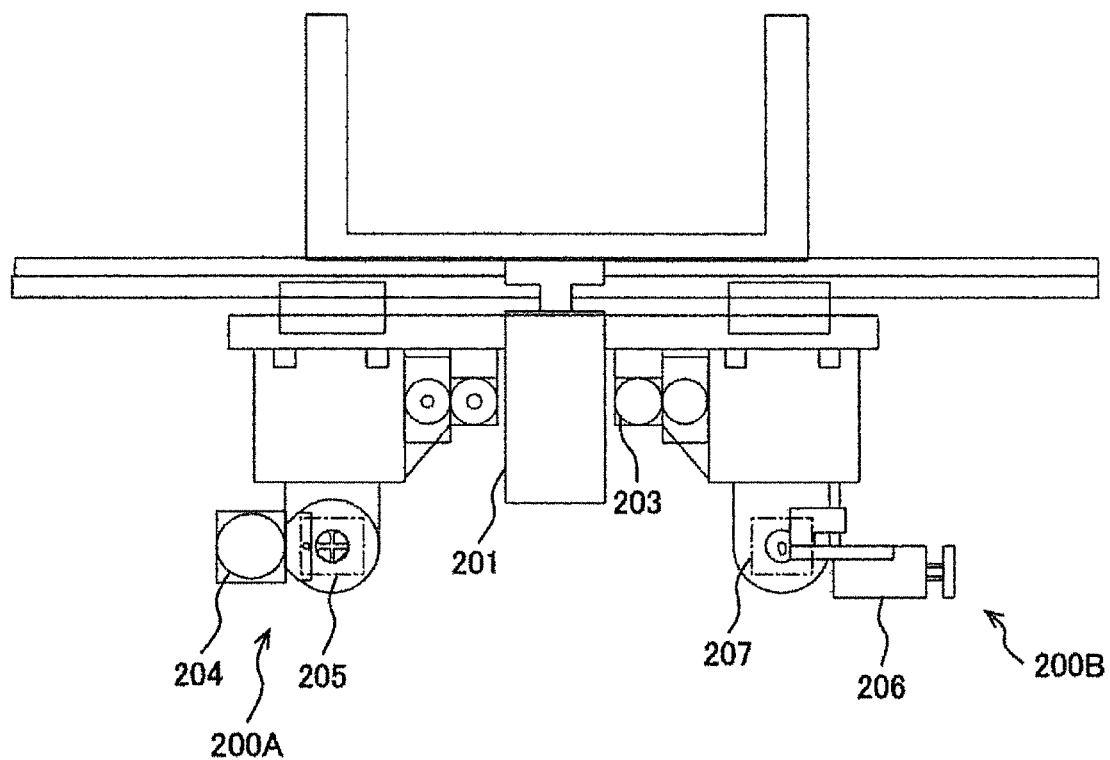
FIG. 13A is a plan view illustrating a configuration of a bending device 200.
Figure 13B:
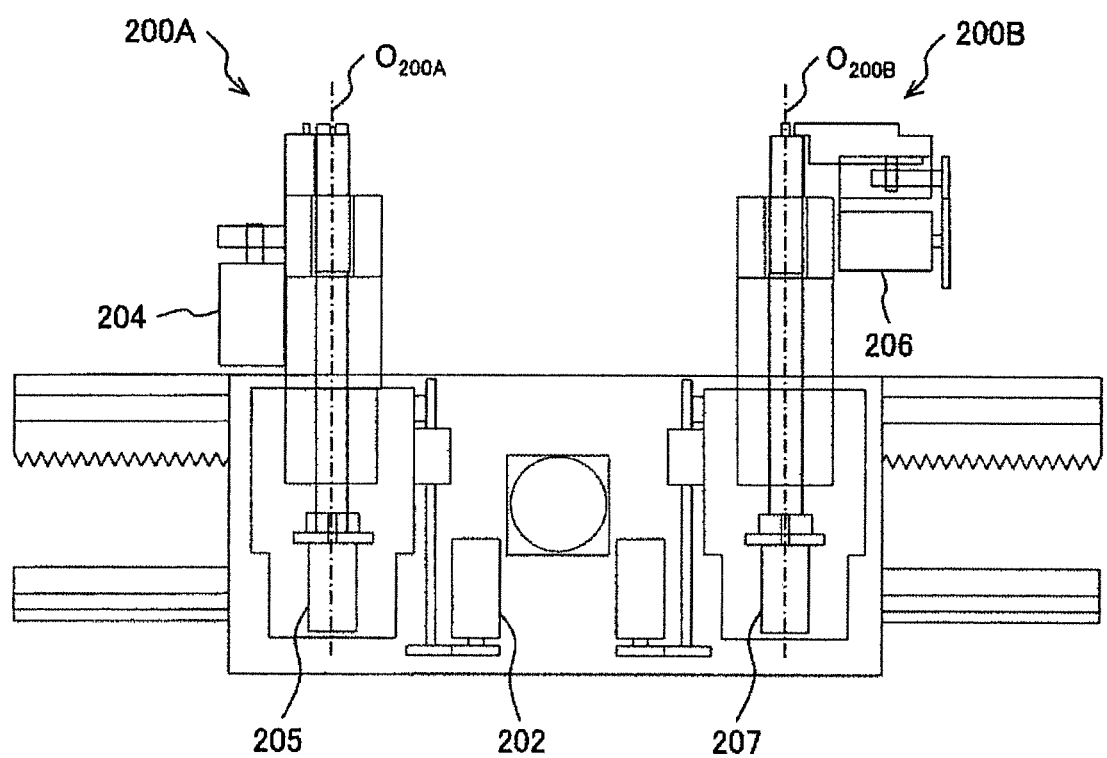
FIG. 13B is a plan view of the bending device 200 illustrated in FIG. 14A when viewed from the lower side.

Next, the bending device 200 of this embodiment will be described using FIGS. 13A and 13B. FIG. 13A is a plan view illustrating a configuration of the bending device 200. FIG. 13B is a plan view of the bending device 200 illustrated in FIG. 13A when viewed from the lower side.

In the bending device 200 of this embodiment, a bending device (first bending unit) 200A which performs a compression bending, and a bending device (second bending unit) 200B which performs a draw bending are integrally formed in one device. The compression bending and the draw bending can be performed using one device by switching the bending device 200A and the bending device 200B to access the linear conductor 1. Further, the bending device 200A is located on the upstream side in the conveyance direction of the linear conductor 1 with respect to the bending device 200B. With such a layout, the linear conductor 1 is subjected to the draw bending process by the bending device 200B after a compression bending process is performed by the bending device 200A.

The bending device 200 is provided with seven motors. A switching motor 201 is provided to switch the bending device 200A and the bending device 200B. In order to exclude, from the linear conductor 1, the core metal of the bending devices 200A and 200B performing the bending process on the linear conductor 1 to switch the bending device 200A and the bending device 200B, the core metal of the bending devices 200A and 200B is necessarily lowered from the linear conductor 1. Therefore, there are provided motors 202 and 203. The motor 202 is used to lower the bending device 200A from the linear conductor 1. In addition, the motor 203 is used to lower the bending device 200B from the linear conductor 1.

As described above, the bending device 200A and the bending device 200B move forward in a direction along a rotation center axis $O_{200A}$ and a center axis (rotation center axis) $O_{200B}$ to access the linear conductor 1, and move backward to retract from the linear conductor 1.

A motor 204 provided on a side near the bending device 200A is used to rotate the core metal used in the compression bending. In the compression bending of this embodiment, two types of grooves having different width are formed in a cross shape in the core metal such that the bending process is performed on the flat wire having a long side and a short side (even any one of the long side and the short side). The motor 204 rotates the core metal such that any one of two types of grooves formed in the cross shape is disposed along the conveyance direction of the linear conductor 1. A motor 205 provided on a side near the bending device 200A is used to rotate the bending pin used in the compression bending around the center axis of the core metal.

A motor 206 provided on a side near the bending device 200B is used to move forward a clamp used in the draw bending toward the core metal or to retract the clamp from the core metal. In addition, a motor 207 provided on a side near the bending device 200B is used to interpose the linear conductor 1 between the clamp and the core metal when the draw bending is performed, and to integrally rotate the clamp and the core metal.

Figure 14A:
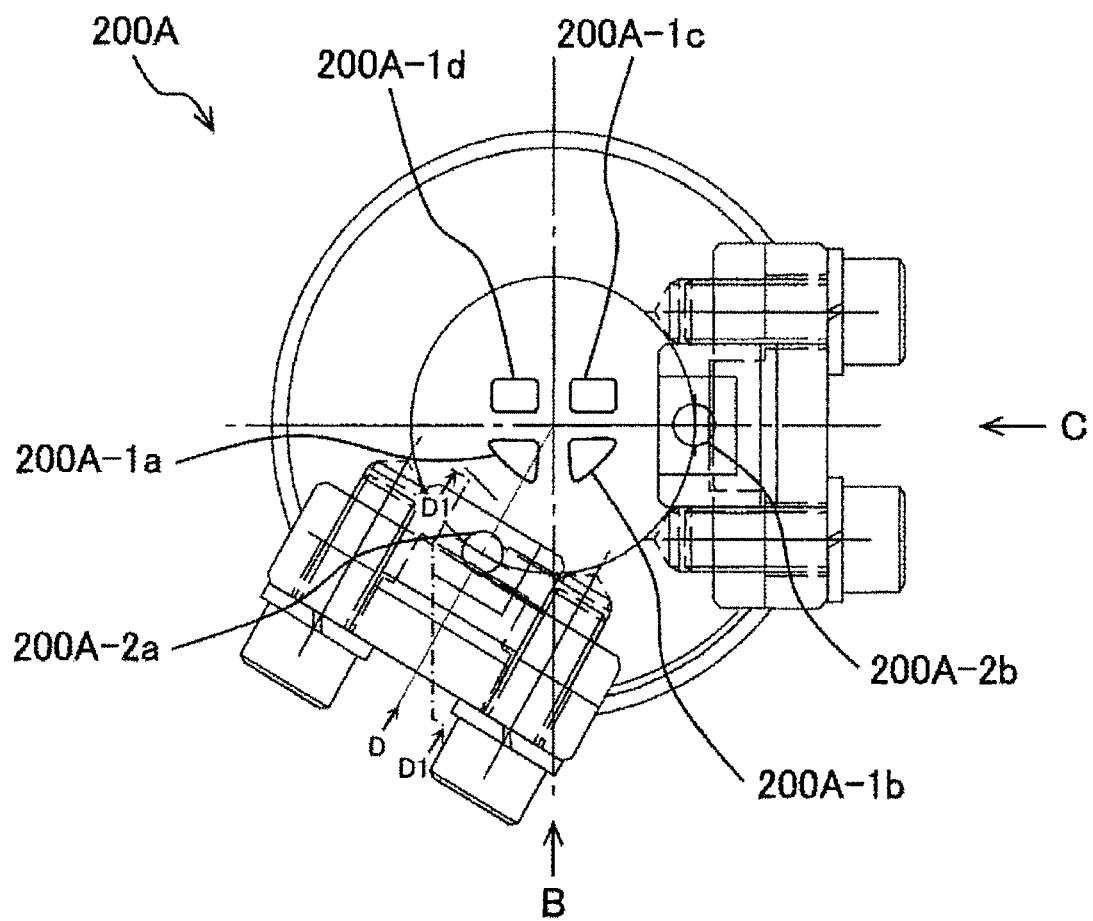
FIG. 14A is a plan view of a bending device 200A when viewed in a direction of a rotation axis of bending pins 200A-2a and 200A2b.
Figure 14B:
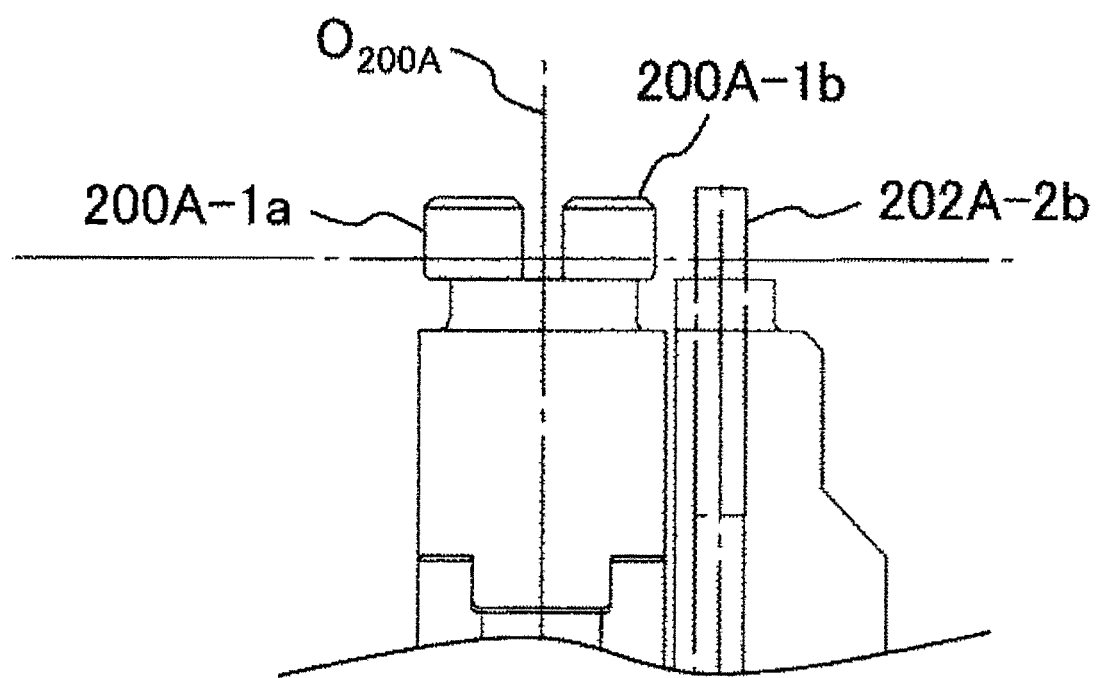
FIG. 14B is a plan view of the bending device 200A illustrated in FIG. 15A when viewed in a direction of arrow B.
Figure 14C:
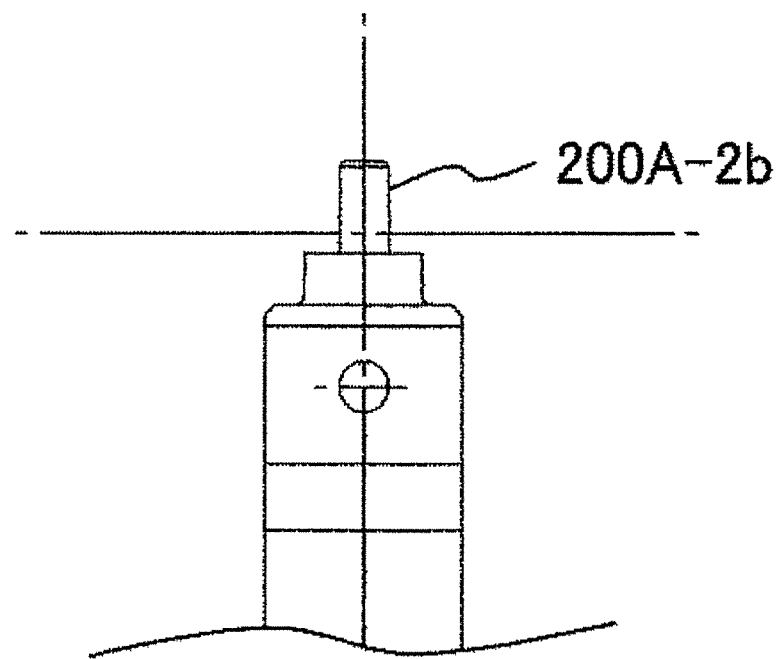
FIG. 14C is a plan view of the bending device 200A illustrated in FIG. 15A when viewed in a direction of arrow C.
Figure 14D:
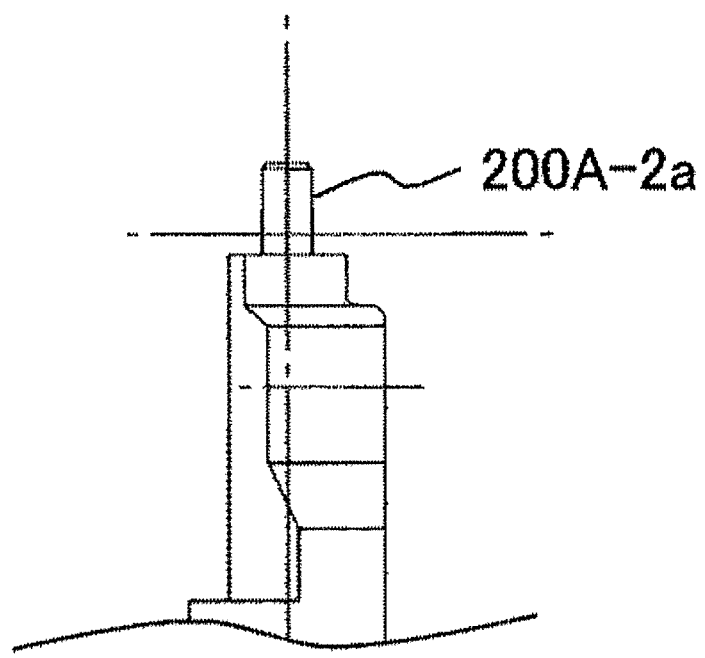
FIG. 14D is a plan view of the bending device 200A illustrated in FIG. 15A when viewed in a direction of arrow D.

The description will be given about the bending device 200A which performs the compression bending using FIGS. 14A to 14D. FIG. 14A is a plan view of the bending device 200A when viewed from the rotation axis direction of bending pins 200A-2a and 200A2b. FIG. 14B is a plan view of the bending device 200A illustrated in FIG. 15A when viewed in a direction of arrow B. FIG. 14C is a plan view of the bending device 200A illustrated in FIG. 14A when viewed from a direction of arrow C. FIG. 15D is a plan view of the bending device 200A illustrated in FIG. 14A when viewed in a direction of arrow D. Part of FIG. 14D illustrates the cross section taken along a plane indicated by arrow D1-D1 of FIG. 14A.

The core metal is configured by four pieces 200A-1a, 200A-1b, 200A-1c, and 200A-1d, and two types of grooves having different width are configured in an intersecting shape (cross) on a plane perpendicular to the rotation axis $O_{200A}$ of the bending pins 200A-2a and 200A-2b. The bending pin 200A-2a and the bending pin 200A2b are disposed around the core metal. The bending pin 200A-2a and the bending pin 200A2b are rotatably driven integrally to the motor 205. Since two types of grooves and two bending pins 200A-2a and 200A-2b are used in different ways, various bending processes can be performed even from any one of the long side and the short side of the flat wire.

Figure 15:
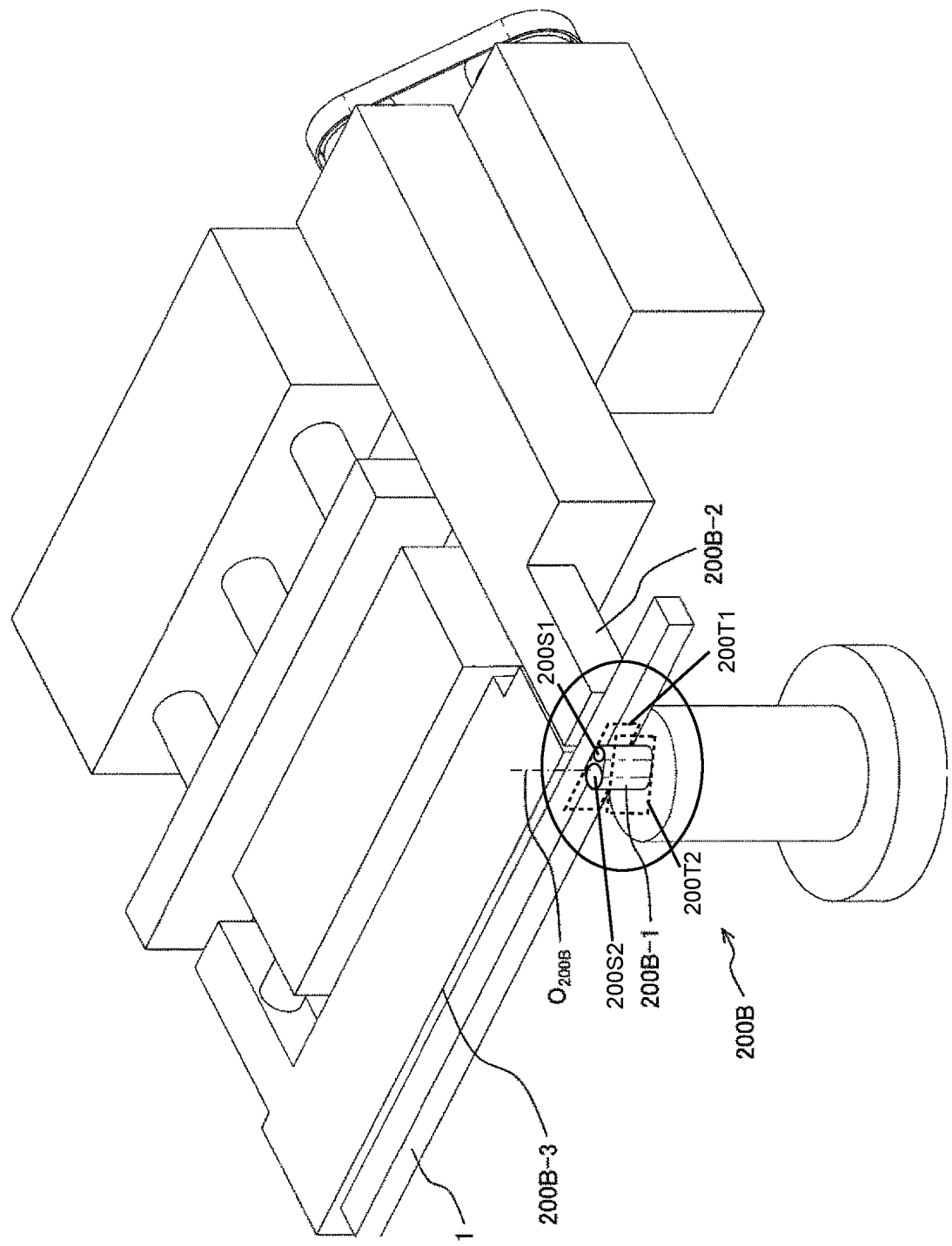
FIG. 15 is a perspective view illustrating a configuration of a bending device 200B.

The bending device 200B performing the draw bending will be described using FIG. 15. FIG. 15 is a perspective view illustrating a configuration of the bending device 200B.

The bending device 200B is a device having a core metal 200B-1, a clamp 200B-2, and a back pad 200B-3. The bending process is performed on the linear conductor 1 such that the linear conductor 1 is interposed by the core metal 200B-1 and the clamp 200B-2, the back pad 200B-3 is attached to the side surface opposite to the side surface of abutting on the core metal 200B-1 of the linear conductor 1, and the core metal 200B-1 and the clamp 200B-2 are integrally rotated about the center axis $O_{200B1}$ of the core metal 200B-1. Further, the center axis (rotation center axis) $O_{200B}$ and the rotation center axis $O_{200A}$ are in parallel, and become flush with each other.

The core metal 200B-1 is configured by a cylindrical surface 200S1 having a large diameter of which the center is matched with the center axis $O_{200B}$ of the core metal 200B-1, a cylindrical surface 200S2 having a small diameter of which the center is decentered from the center of the large-diameter cylindrical surface, and two tangent planes 200T1 and 200T2 which abut on the large-diameter cylindrical surface and the small-diameter cylindrical surface. The linear conductor 1 is interposed between the tangent planes 200T1 and 200T2 formed in the core metal 200B-1 and the tip flat surface of the clamp 200B-2, and bent while winding around the large-diameter cylindrical surface of the core metal 200B-1 by the rotation operation of the core metal 200B-1 and the clamp 200B-2.

In this procedure, the linear conductor 1 is pulled out according to a bending angle. Therefore, the back pad 200B-3 is not fixed, and is provided slidably along the linear conductor 1. Therefore, the back pad 200B-3 slides together with the linear conductor 1 while the linear conductor 1 is pulled out. Therefore, it is possible to prevent the linear conductor 1 from being scratched with respect to the back pad 200B-3.

Figure 16A:
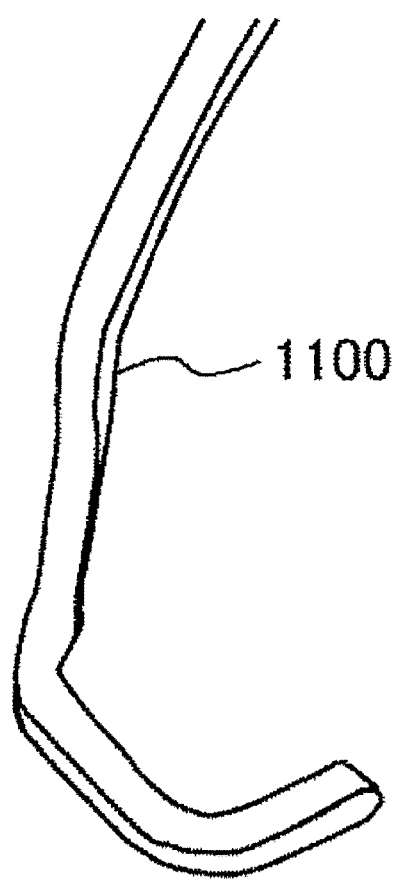
FIG. 16A is a perspective view illustrating a shape of a split coil 1100' before a bending process is performed by a draw bending.
Figure 16B:
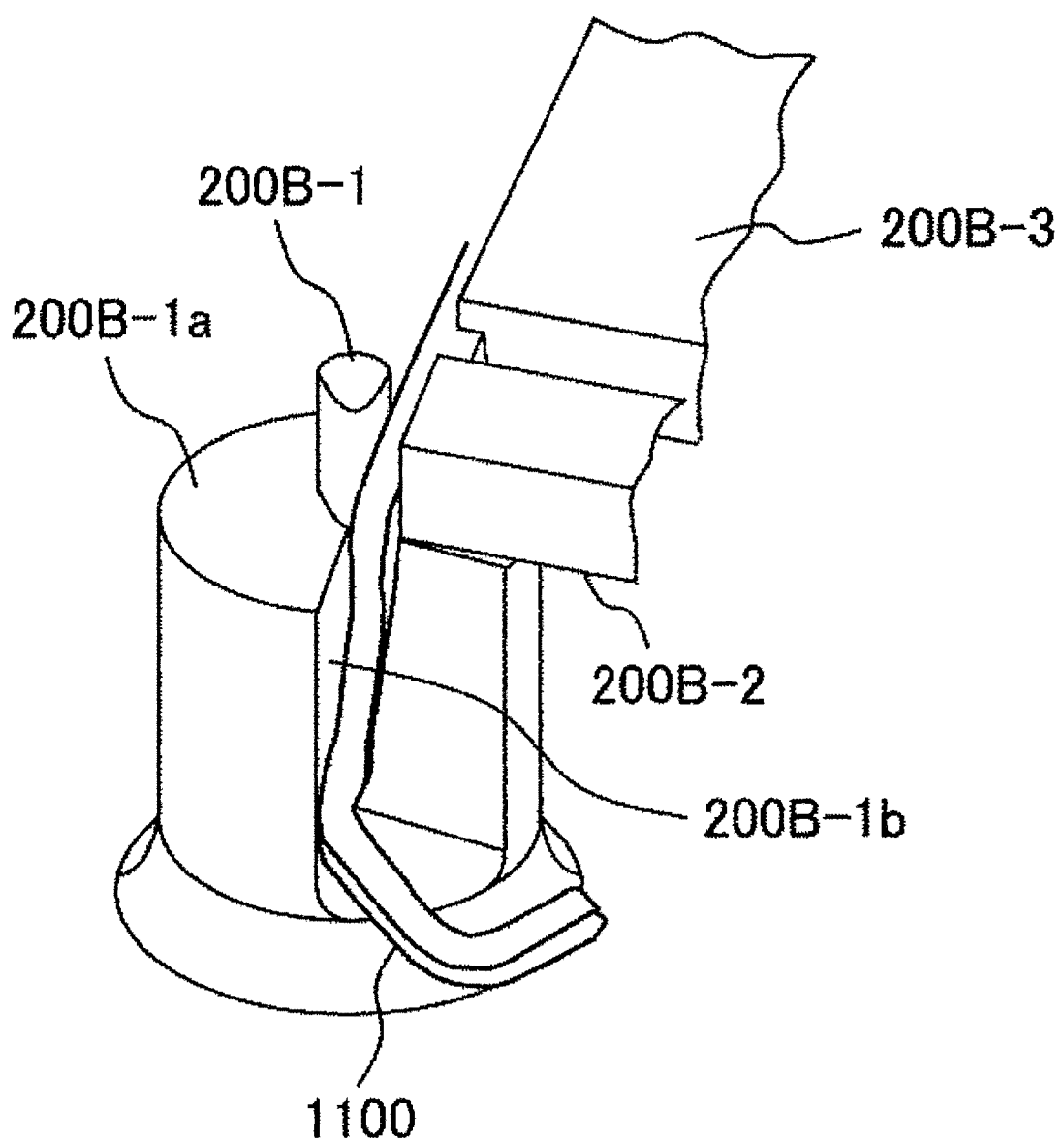
FIG. 16B is a perspective view illustrating the vicinity of a core metal 200B-1, a clamp 200B-2, and a back pad 200B-3.
Figure 16C:
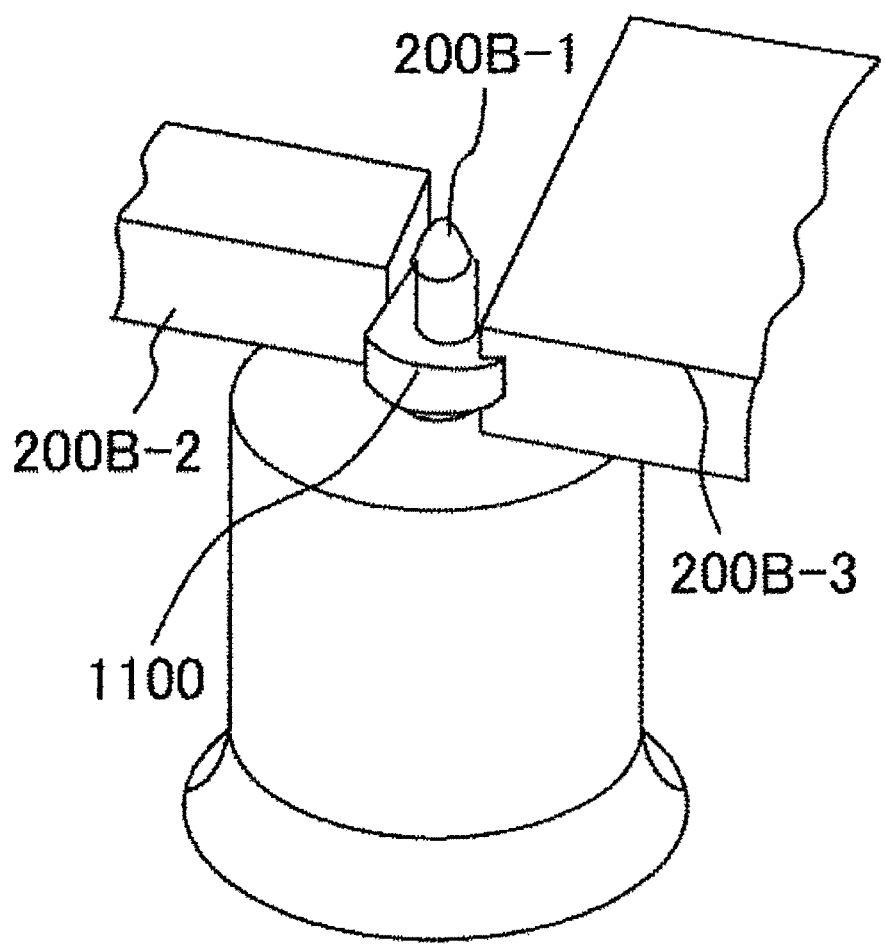
FIG. 16C is a perspective view illustrating a state in which the split coil 1100' is subjected to the bending process of about 180 degrees by the draw bending.

The bending process by the draw bending will be described using FIGS. 16A, 16B, and 16C. FIG. 16A is a perspective view illustrating a shape of a split coil 1100' before the bending process is performed by the draw bending. The split coil 1100' illustrated in FIG. 16A is used as the split coil 1100 which is provided in the motor stator 2000 illustrated in FIG. 17. FIG. 16B is a perspective view illustrating the vicinity of the core metal 200B-1, the clamp 200B-2, and the back pad 200B-3. FIG. 16C is a perspective view illustrating a state where the bending process of about 180 degrees is performed by the drawing bending on the split coil 1100'.

A bending inner peripheral side of the split coil 1100' illustrated in FIG. 16A is formed thick compared to the outer peripheral side by the compression bending which is performed before the bending process by the draw bending performed so far, and the cross section thereof is formed in a trapezoidal shape. When the thick surface abuts on a surface 200B-1a of a core metal holder and the linear conductor 1 is interposed between the core metal 200B-1 and the clamp 200B-2, an inclined surface linking between the thick surface and the thin surface of the linear conductor 1 abuts on the core metal 200B-1 and the clamp 200B-2. Therefore, when the draw bending is performed after the compression bending, the inclined surface is twisted along the tip surface of the clamp 200B-2, and twisting occurs in the completed split coil 1100.

In this embodiment, a notch surface 200B-1b is provided in the core metal holder which supports the core metal 200B-1. When the draw bending is performed, the split coil 1100' tending to be twisted comes to abut on the notch surface 200B-1b, and thus the twisting is suppressed. In this way, the notch surface 200B-1b performs a role of the abutting surface to suppress the twisting.

According to this embodiment, the twisting caused by the draw bending is suppressed with respect to the split coil (segment conductor) 1100 formed by performing the draw bending after the compression bending, and it is possible to process the split coil 1100 having a desired shape in which the twisting is suppressed.

In addition, the bent split coil 1100 in this embodiment includes a compression bent portion (a first curved portion or a first bent portion) which is subjected to the compression bending process by the bending device 200A, and a draw bent portion (a second curved portion or a second bent portion) which is subjected to the draw bending process by the bending device 200B. A straight portion 1130 is provided between a compression bent portion 1110 and a draw bent portion 1110 (see FIG. 17), and the compression bent portion 1110 and the draw bent portion 1120 are disposed adjacent through the straight portion 1130. Then, the impression is formed in a portion abutting on the core metal 200B-1 (molding mechanism) on the inner peripheral side of the draw bent portion (the second curved portion or the second bent portion) which is subjected to the draw bending process by the bending device 200B. The impression is not formed on the outer peripheral side of the draw bent portion. In addition, the impression is also not formed in the compression bent portion (the first curved portion or the first bent portion) which is subjected to the compression bending process by the bending device 200A. Therefore, the impression is formed only on the inner peripheral side of the draw bent portion of the split coil 1100 subjected to the bending process in this embodiment.

The impression is likely to cause damage on the insulating coating (insulating film) of the linear conductor 1 or the split coil 1100. For example, when the impression is formed on the outer peripheral side and the inner peripheral side of the bent portion of the split coil 1100, the reliability in electrical insulation is degraded between the adjacent split coils 1100. However, the impression is formed only on the inner peripheral side of the bent portion in this embodiment, so that it is possible to keep a high reliability in electrical insulation between the adjacent split coils 1100.

Further, the invention is not limited to the above embodiments, and various modifications can be made. For example, the embodiments are described in a clearly understandable way for the invention, and thus the invention is not necessarily to provide all the configurations. In addition, some configurations of a certain embodiment may be replaced with the configurations of another embodiment, and the configuration of the other embodiment may also be added to the configuration of a certain embodiment. Furthermore, additions, omissions, and substitutions may be made on some configurations of each embodiment using other configurations.

REFERENCE SIGNS LIST

100 U-shaped coil forming device
110 uncoiler
120 buffer
130 correction unit (correction device)
140 peeling unit (peeling device)
150 bending unit (bending device)
160 conveying unit (conveying device)
170 pressing unit (press device)

180 control device
185 storage unit (magazine)
500 deformed-coil forming device
190 second peeling unit (peeling device)
200 bending unit (bending device) 200

The invention claimed is:

1. A coil forming device, comprising:
   a first bending device configured to perform a compression bending process with respect to a linear conductor and to rotate about a first rotation center axis; and
   a second bending device configured to perform a draw bending process with respect to the linear conductor and rotate about a second rotation center axis parallel to the first rotation center axis,
   wherein the second bending device includes a core metal, a clamp, a back pad, and a core metal holder, the core metal holder configured to support the core metal and comprising a notch surface provided in the core metal holder along the second rotation center axis disposed at a center of the core metal,
   wherein the second bending device performs the draw bending process on the linear conductor by abutting the linear conductor on the notch surface such that the linear conductor is interposed by the core metal and the clamp, the back pad is attached to the linear conductor from a side where the clamp is attached, and the core metal and the clamp are integrally rotated,
   wherein the first bending device and the second bending device are integrally formed in a same device, and
   wherein the first bending device and the second bending device rotate separately in a first direction to access the linear conductor so as to perform the compression bending process and the draw bending process on the linear conductor, then rotate in a second direction opposite to the first direction to retract from the linear conductor.

2. The coil forming device according to claim 1,
   wherein the back pad of the second bending device is configured to be slidable along the linear conductor.

3. The coil forming device according to claim 2,
   wherein the second bending device is located on a downstream side in a conveyance direction of the linear conductor with respect to the first bending unit.

4. The coil forming device according to claim 3,
   wherein the core metal of the second bending device includes a cylindrical surface having a first diameter, a cylinder surface having a second diameter smaller than the first diameter, and two tangent planes that abut on the cylindrical surface having the first diameter and the cylindrical surface having the second diameter,
   wherein a center of the cylindrical surface having the first diameter is matched with the second rotation center axis, and
   wherein a center of the cylindrical surface having the second diameter is at a position decentered from the center of the cylindrical surface having the first diameter.

5. The coil forming device according to claim 1,
   wherein the first bending device comprises a core metal and at least one bending pin, the core metal configured to rotate about the first rotation center axis disposed at a center of the core metal, and
   wherein the core metal is formed with at least one groove.

* * * * *